(12) United States Patent
Kotecha et al.

(10) Patent No.: US 9,077,649 B2
(45) Date of Patent: Jul. 7, 2015

(54) SPLIT CUSTOMER PREMISES EQUIPMENT ARCHITECTURE FOR PROVISIONING FIXED WIRELESS BROADBAND SERVICES

(75) Inventors: Lalit R. Kotecha, San Ramon, CA (US); Sergio Aguirre, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 214 days.

(21) Appl. No.: 13/482,562

(22) Filed: May 29, 2012

(65) Prior Publication Data

US 2013/0322251 A1 Dec. 5, 2013

(51) Int. Cl.
| | | |
|---|---|---|
| H04L 12/851 | (2013.01) | |
| H04W 28/04 | (2009.01) | |
| H04N 21/00 | (2011.01) | |
| H04H 20/63 | (2008.01) | |
| H04W 28/24 | (2009.01) | |
| H04N 21/4363 | (2011.01) | |
| H04N 21/61 | (2011.01) | |

(52) U.S. Cl.
CPC .............. *H04L 47/24* (2013.01); *H04W 28/24* (2013.01); *H04N 21/00* (2013.01); *H04N 21/4363* (2013.01); *H04N 21/43632* (2013.01); *H04N 21/43637* (2013.01); *H04N 21/6143* (2013.01); *H04H 20/63* (2013.01)

(58) Field of Classification Search
USPC ...................... 370/236; 725/98, 106
See application file for complete search history.

(56) References Cited

U.S. PATENT DOCUMENTS

| | | | |
|---|---|---|---|
| 6,628,627 B1 * | 9/2003 | Zendle et al. ................ | 370/310 |
| 2006/0098614 A1 * | 5/2006 | Moon et al. ................ | 370/338 |
| 2007/0091990 A1 * | 4/2007 | Smith et al. ................ | 375/222 |
| 2010/0311321 A1 * | 12/2010 | Norin ........................ | 455/3.02 |
| 2010/0325671 A1 * | 12/2010 | Jaramillo ................... | 725/72 |
| 2012/0036541 A1 * | 2/2012 | Kotecha et al. ............. | 725/62 |
| 2012/0052828 A1 * | 3/2012 | Kamel et al. ............... | 455/226.2 |
| 2012/0243517 A1 * | 9/2012 | Aguirre et al. ............. | 370/338 |
| 2012/0260299 A1 * | 10/2012 | Kotecha et al. ............ | 725/118 |
| 2012/0264367 A1 * | 10/2012 | Aguirre et al. ............ | 455/3.06 |
| 2012/0314585 A1 * | 12/2012 | Kamdar et al. ............ | 370/242 |
| 2013/0145402 A1 * | 6/2013 | Kotecha et al. ............ | 725/62 |

* cited by examiner

*Primary Examiner* — Michael Thier
*Assistant Examiner* — Yaotang Wang

(57) ABSTRACT

An indoor broadband device receives, from a user device, a first request for content; determines a quality of service (QoS) level at which the content is to be provided to the user device; provides a second request for the content, at the determined QoS level, to a wireless access network, the wireless access network connecting to a network that provides broadband services; receives, based on the second request, the content, at the determined QoS level, from the wireless access network; processes the content in a manner that conforms to the QoS level and in a format that is supported by the user device; and provides the content to the user device.

20 Claims, 12 Drawing Sheets

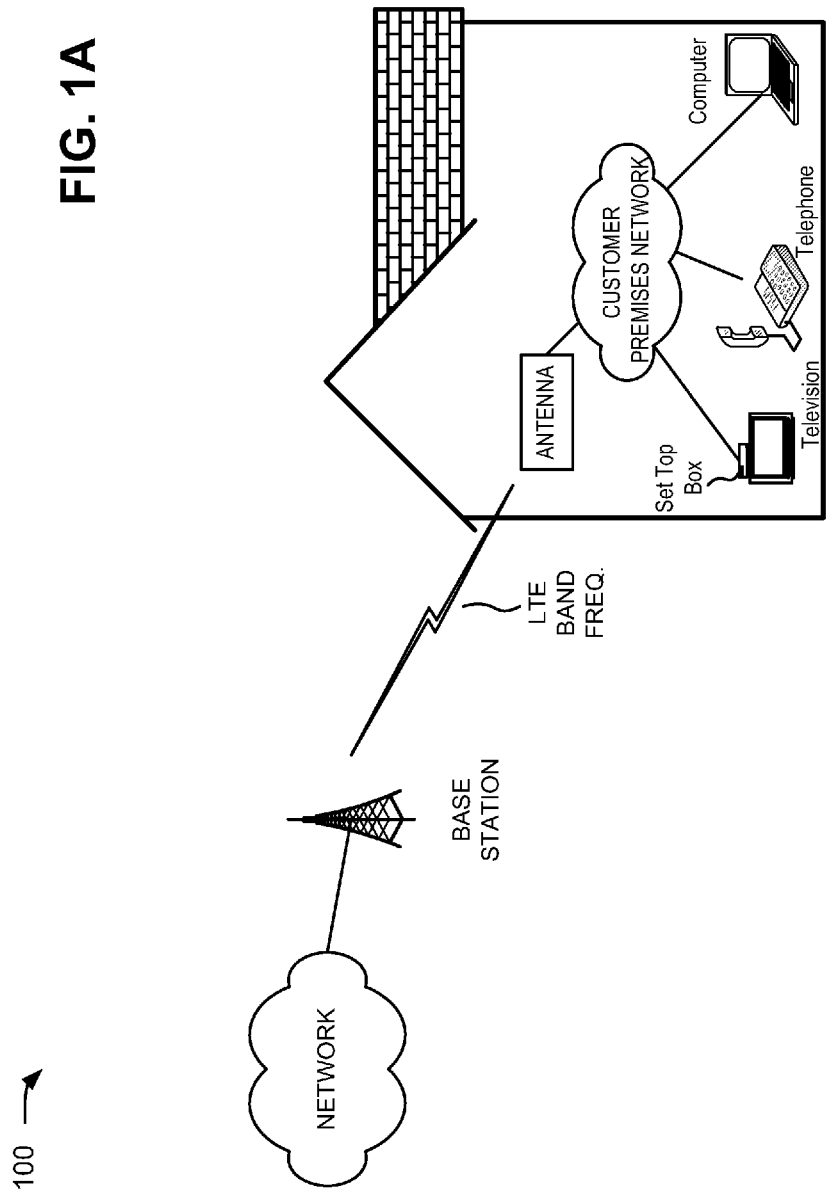

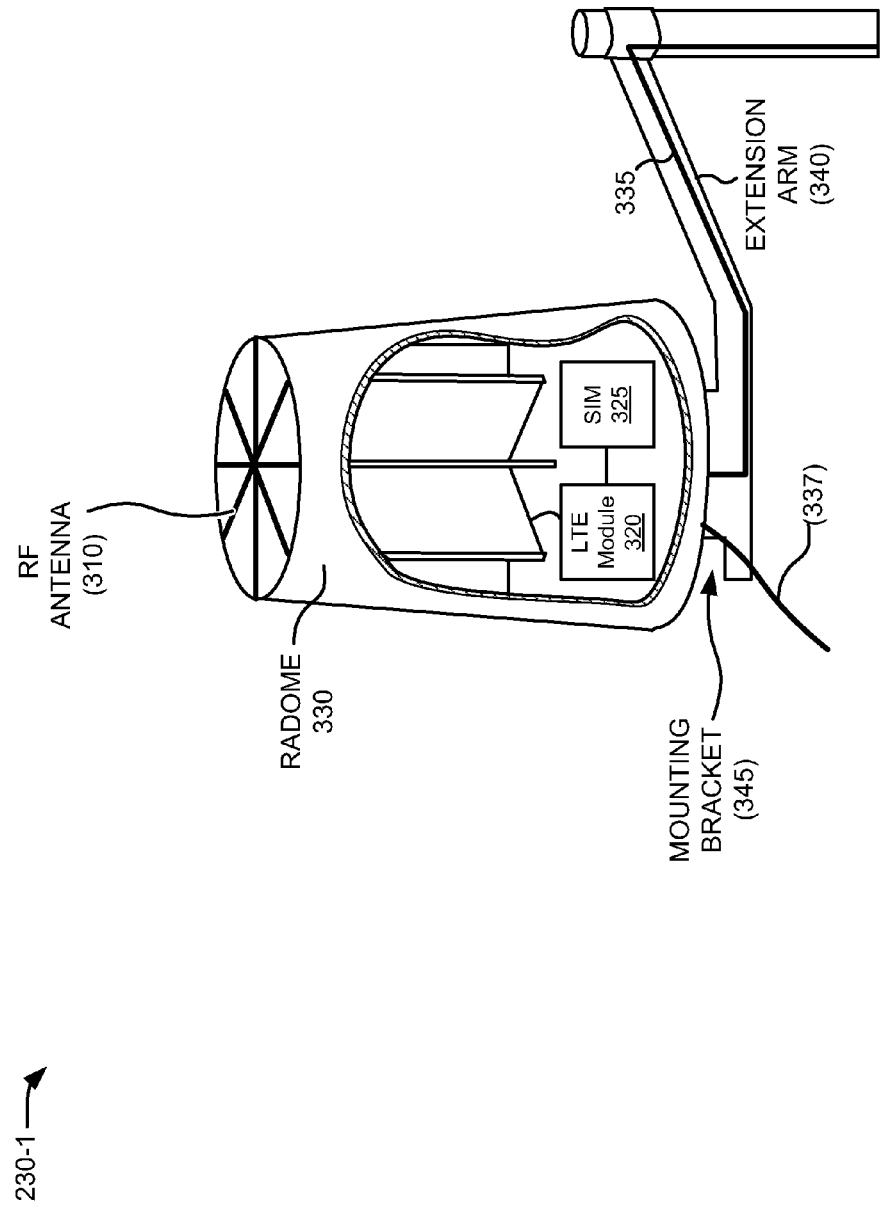

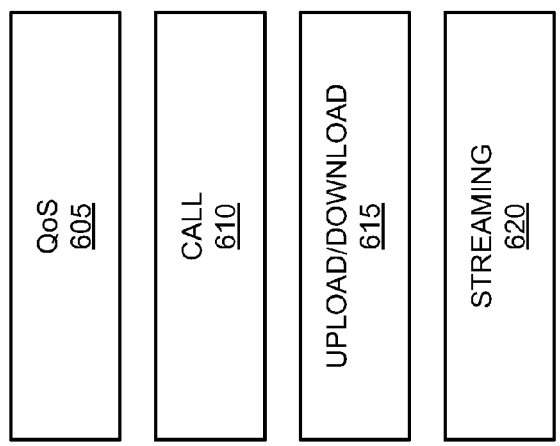

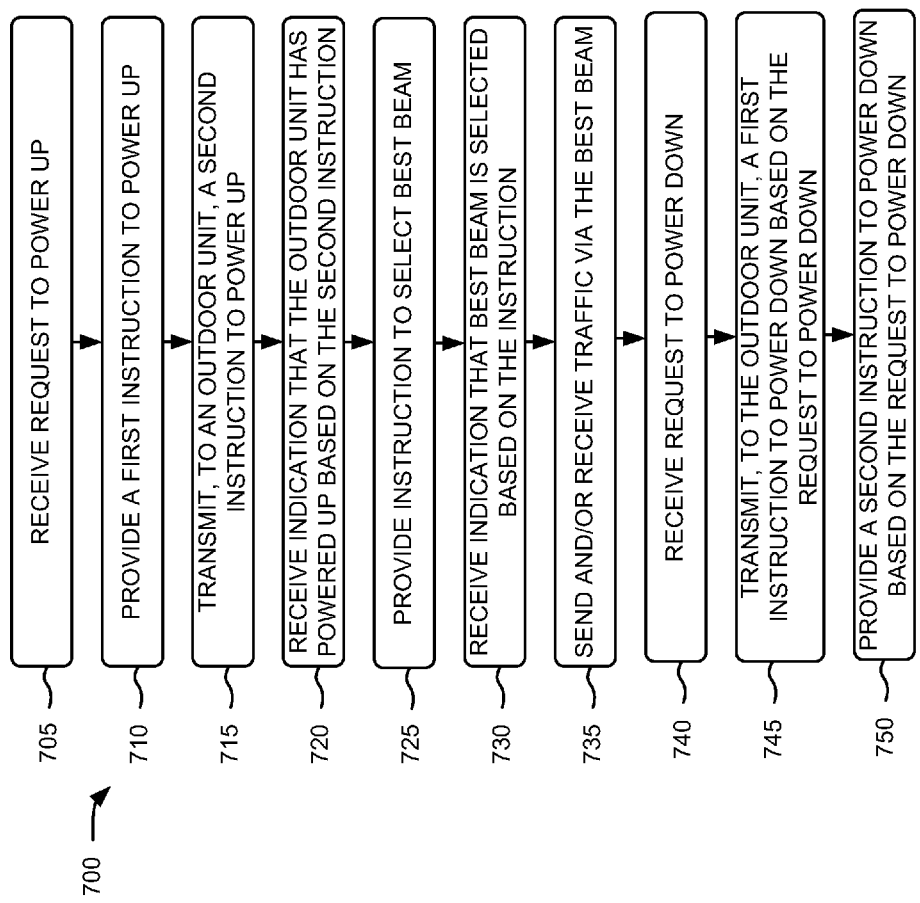

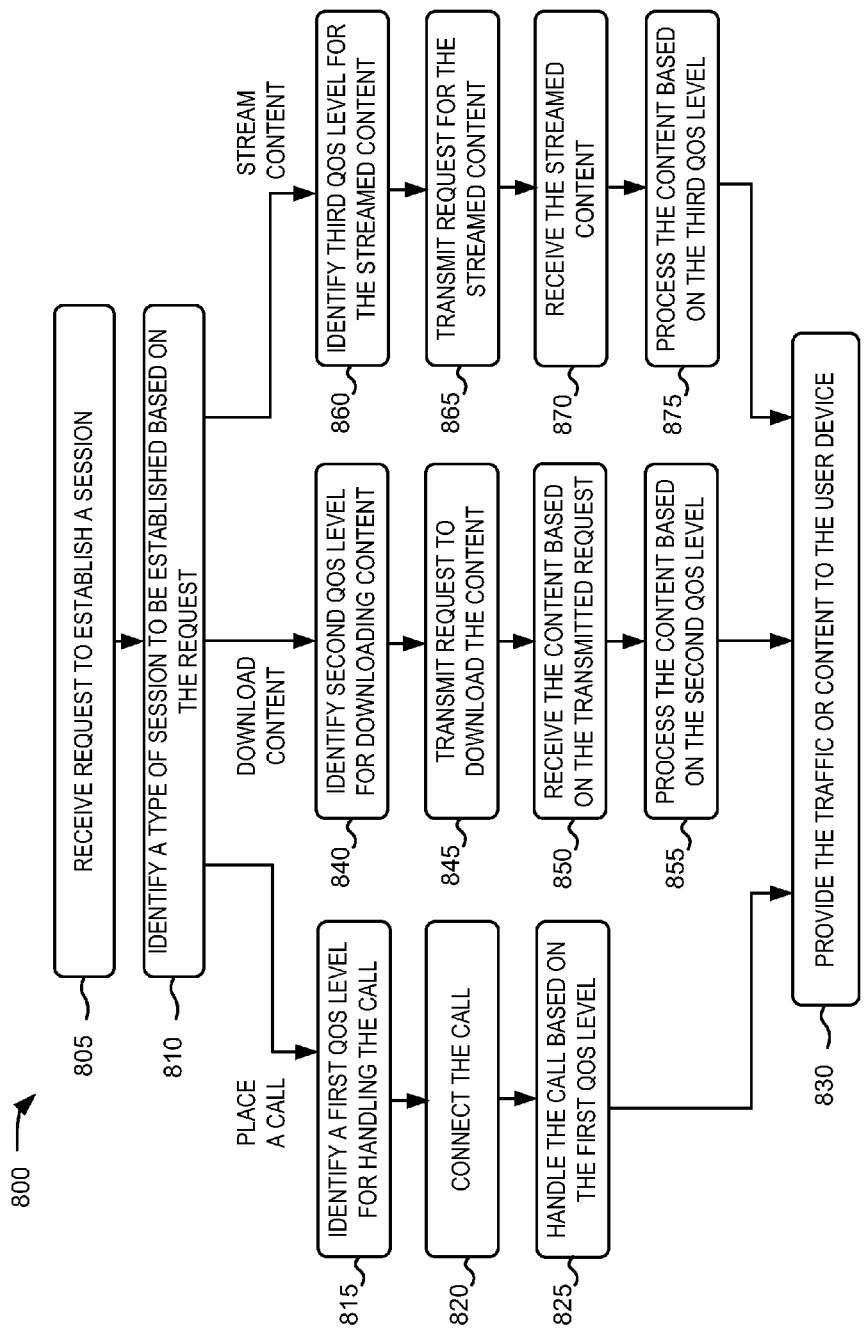

SPLIT CUSTOMER PREMISES EQUIPMENT ARCHITECTURE FOR PROVISIONING FIXED WIRELESS BROADBAND SERVICES

BACKGROUND

Bundled media services, such as combination packages of television, telephone, and broadband Internet services, have been successfully offered to households with wired connections to service provider networks. Households in areas without such wired connections (e.g., customers in regions that cannot be reached via conventional communication media, such as optical cables, copper cables, and/or other fixed wire-based technologies) may rely on fixed wireless networks for some of these services (e.g., broadband access). However, previous generations of fixed wireless networks have generally been unsuccessful. Expensive network equipment and customer premises equipment (CPE), high CPE installation costs, use of proprietary technology, and low data rates are among some of the reasons that these fixed wireless networks remained unpopular. As wireless network data rates improve using fourth generation (4G) technologies, such as Long-Term Evolution (LTE), such network data rates have made it easier to implement fixed wireless networks.

BRIEF DESCRIPTION OF THE DRAWINGS

FIGS. 1A and 1B are diagrams illustrating example customer premises arrangements;

FIG. 3A is a diagram of example components of a type of outdoor unit illustrated in FIG. 2;

FIG. 6 is a diagram of example functional components of an application module associated with an indoor unit depicted in FIG. 3B or 4B;

FIG. 7 is a flow chart of an example process for controlling customer premises equipment; and FIG. 8 is a flow chart of an example process for processing different types of broadband traffic based on one or more QoS levels.

DETAILED DESCRIPTION OF PREFERRED EMBODIMENTS

The following detailed description refers to the accompanying drawings. The same reference numbers in different drawings may identify the same or similar elements.

Systems and/or methods, described herein, may provide customer premises equipment that enables fixed wireless broadband services, such as services that previously have been obtained from a satellite network, to be provisioned to a user device without communicating with the satellite network. The services, previously obtained from the satellite network, may be obtained, by the customer premises equipment, from another network, such as a long term evolution (LTE) network that is based on the Third Generation Partnership Project (3GPP) wireless standard. The customer premises equipment may include an outdoor unit, installed outside the customer premises, that receives the broadband services wirelessly from the LTE network. The customer premises equipment may include an indoor unit, installed within the customer premises, that receives the broadband services from the outdoor unit and that provides the broadband services to a user device associated with the customer premises. The customer premises equipment may also, or alternatively, provide the broadband services at a Quality of Service level (hereinafter referred to as "QoS level") associated with a LTE standard and/or for which the user subscribed. In so doing, the broadband services, received from the LTE network, may be provisioned to the user device at a lower cost and with less complexity than when the broadband services, received from the LTE network and the satellite network, are provisioned to the user device.

Figure 1B:
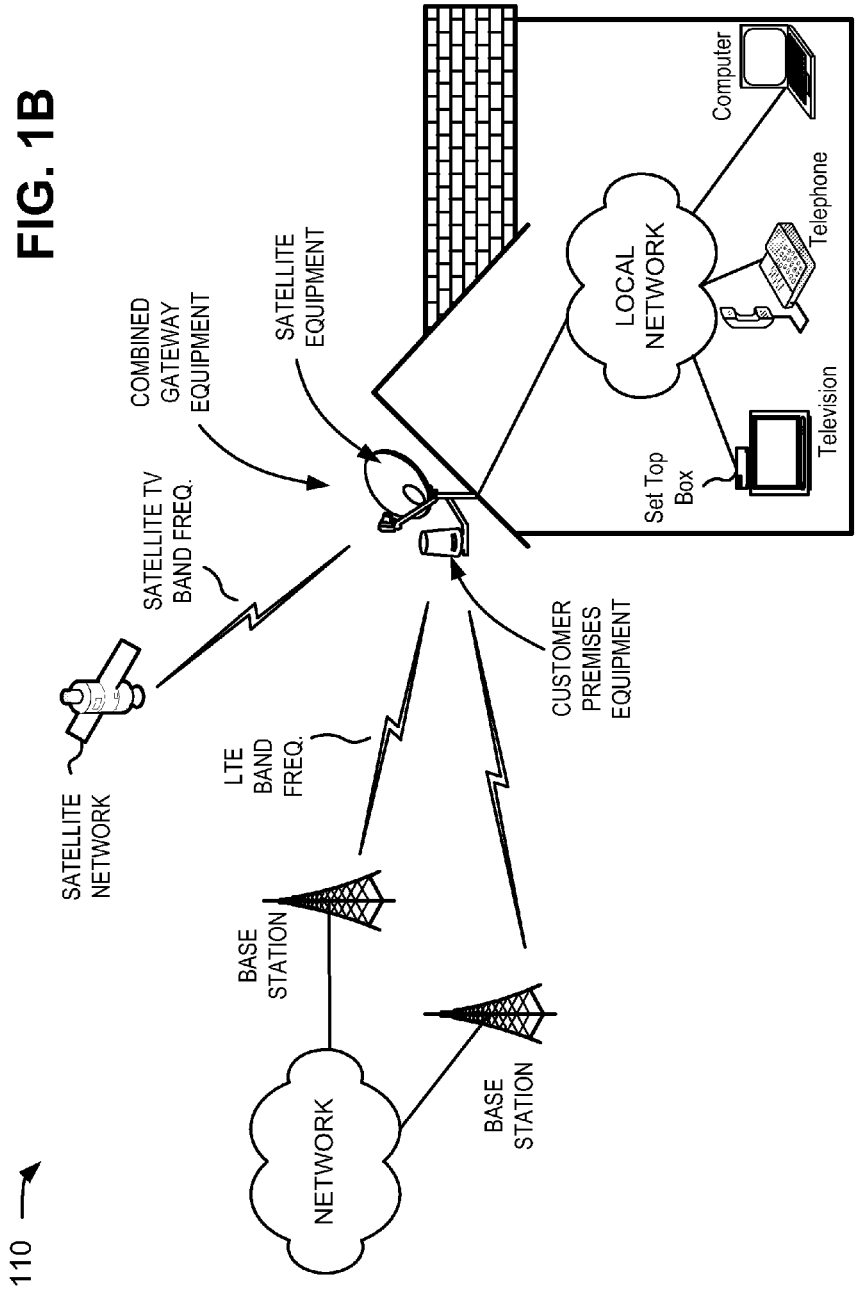

FIGS. 1A and 1B are diagrams illustrating example customer premises arrangements. As illustrated in FIG. 1A, an example arrangement 100 may enable fixed wireless traffic, associated with a LTE-based broadband service, to be received by a customer premises network. The customer premises network may, for example, connect to a network, via a base station, through a two-way wireless connection and using a LTE band frequency. The base station may be capable of transmitting the traffic, based on a LTE protocol, that enables third generation (3G) and/or fourth generation (4G) broadband services to be provided to the customer premises network. The customer premises network may include devices that are capable of communicating with the base station using the LTE protocol via one or more omni-directional antennas tuned to a LTE band frequency. The customer premises network may receive traffic from the network and may provide the traffic to one or more types of user devices (e.g., a computer, a landline telephone, etc.) and/or to a set top box connected to a video device (e.g., a television).

As illustrated in FIG. 1B, another example arrangement 110 may enable fixed wireless traffic, associated with an LTE-based broadband service and/or satellite-based broadband service, to be provided to a local network via combined gateway equipment. As shown in FIG. 1B, the combined gateway equipment may include satellite equipment and customer premises equipment. The satellite equipment may include a satellite antenna and/or one or more devices that enable the satellite equipment to communicate with a satellite network to receive satellite traffic (e.g., live broadcast video, video on demand (VOD), etc.). The customer premises equipment may receive traffic from a network and via one or more base stations that communicate using the LTE protocol. The customer premises equipment may identify from which base station that traffic, associated with a strongest signal and/or highest QoS level, can be received. The satellite equipment and/or the customer premises equipment may provide the traffic to one or more types of user devices (e.g., a computer, a telephone, etc.) and/or set top box connected to a video display device (e.g., a television, etc.) via a local network. The traffic may be provided to the user devices at higher QoS level than the customer premises network of FIG. 1A.

Figure 1C:
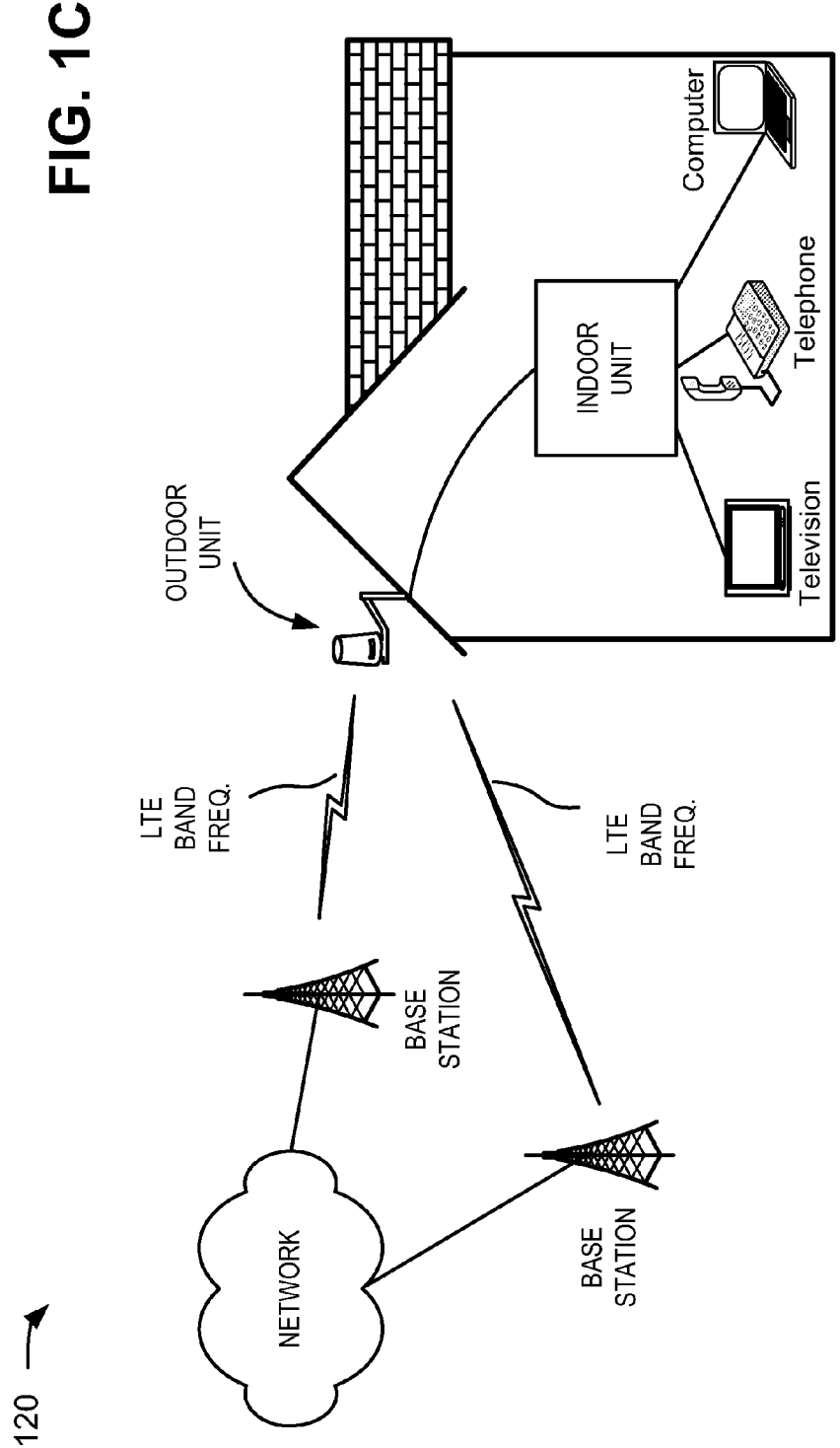
FIG. 1C is a diagram illustrating an overview of an example implementation described herein.

FIG. 1C is a diagram illustrating an overview of an example implementation 120 described herein. As illustrated in FIG. 1C, example implementation 120 may enable fixed wireless traffic, associated with LTE-based broadband services, to be provided to one or more user devices using customer premises equipment that includes an indoor unit and an outdoor unit. The indoor unit and/or the outdoor unit may not include satellite equipment and/or may not communicate with a satellite network. As shown in FIG. 1C, the outdoor unit may receive traffic, from a network and via one or more base stations, based on the LTE protocol. The outdoor unit may, as described above in FIG. 1B, identify from which base station and/or serving cell that traffic, associated with a strongest signal and/or highest QoS level, can be received. The outdoor unit may provide the traffic to the indoor unit. The indoor unit may control the outdoor unit (e.g., to power up, power down, determine from which base station to receive traffic, etc.). The indoor unit may also process the traffic in a manner that conforms to a QoS level associated with a LTE standard and/or to which a user, of the user devices (e.g., computer, a telephone, a television, etc.), has subscribed. The indoor unit and the outdoor unit may, thus, interact to receive the broadband services and/or to provision the broadband services, to the user devices, at a lower cost and with less complexity than when the broadband services, received from the LTE network and the satellite network, are provisioned to the user devices.

Figure 2:
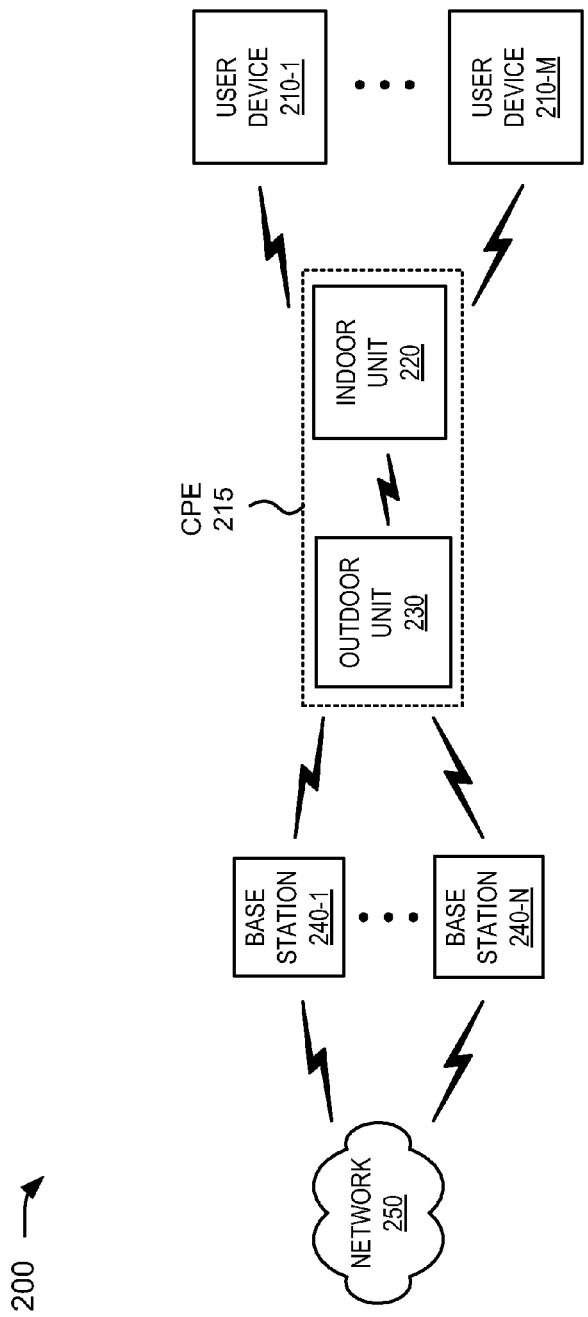
FIG. 2 is a diagram of an example environment in which systems and/or methods described herein may be implemented.

FIG. 2 is a diagram of an example environment 200 in which systems and/or methods described herein may be implemented. As illustrated, environment 200 may include a group of user devices 210 (where M≥1) (hereinafter referred to collectively as "user devices 210" and individually as "user device 210"), customer premises equipment 215, a group of base stations 240-1, . . . 240-N, (where N≥1) (hereinafter referred to collectively as "base stations 240" and individually as "base station 240"), and a network 250.

User device 210 may include any computation or communication device, such as a wireless mobile communication device that is capable of communicating with customer premises equipment 215. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a television, a landline telephone, a desktop computer, a laptop computer, a tablet computer, a camera, a personal gaming system, an appliance, or another type of computation or communication device. User device 110 may send traffic to and/or receive traffic from customer premises equipment 215.

Customer premises equipment 215 may generally include mechanisms for communicating with base station 240 (to provide radio frequency (RF)-based communications) and/or user device 210 (to provide wired and/or wireless communications). Customer premises equipment 215 may include an indoor unit 220 and an outdoor unit 230.

Indoor unit 220, to be described in greater detail below, may include one or more components that enable indoor unit 220 to communicate, via wired and/or wireless communications, with user device 210 and/or outdoor unit 230. Indoor unit 220 may, for example, receive traffic from outdoor unit 230 and may provide the traffic to user device 210. In one example, indoor unit 220 may provide the traffic in a format that is supported by user device 210 and/or at a particular QoS level. Additionally, or alternatively, indoor unit 220 may provide instructions to outdoor unit 230 (e.g., using a control protocol) to cause outdoor unit 230 to power up, to power down, to initialize (e.g., during installation, etc.) to select via which base station 240 to communicate, to reset (e.g., during a repair operation), to identify and/or remedy a condition associated with traffic, etc. Indoor unit 220 may also, or alternatively, determine which LTE protocol to use to process traffic, and may instruct outdoor unit 230 to use the determined LTE protocol to communicate with base station 240.

Outdoor unit 230, to be described in greater detail below, may include one or more components that enable outdoor unit 230 to wirelessly communicate with base station 240 and/or to communicate with indoor unit 220 via wired and/or wireless communications. Outdoor unit 230 may, for example communicate with base station 240 based on a protocol that is being used by base station 240 (e.g., a LTE protocol, a multicast/broadcast protocol, etc.) and/or based on an instruction received from indoor unit 220. Outdoor unit 230 may also, or alternatively, change via which base station 240 to communicate based on an amount of signal strength associated with traffic being received by one or more base stations 240 and/or based on an instruction received from indoor unit 220.

Base station 240 may include one or more computation and/or communication devices that receive traffic from network 250 and transmit that traffic to customer premises equipment 215 via an air interface. Base station 240 may also receive traffic from customer premises equipment 215 and transmit that traffic to network 250. In one example implementation, base station 240 may utilize LTE standards operating in a 700 megahertz (MHz) frequency band and/or some other frequency band. Additionally, or alternatively, base station 240 may correspond to a serving enhanced Node B (eNB), associated with an LTE network.

Network 250 may include one or more wired and/or wireless networks. For example, network 250 may include a cellular network, a public land mobile network (PLMN), a second generation (2G) network, a third generation (3G) network, a fourth generation (4G) network, a fifth generation (5G) network, and/or another network. Additionally, or alternatively, network 250 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

In implementations described herein, customer premises equipment 215 may include LTE functionality that provides resources and capacity (e.g., bandwidth, data rate, processing capacity, etc.) to handle high bandwidth content (e.g., live streaming video, video on demand, etc.) that would otherwise be handled using a combined gateway device (e.g., that includes RF communications devices and satellite communications devices). Customer premises equipment 215 may, thus, provide the high bandwidth content to user device 210 without the complexity and/or cost associated the satellite equipment and/or communicating with a satellite network. Using customer premises equipment 215 may reduce equipment installation time due to the simplified architecture. Both installation costs and maintenance costs may be reduced.

While implementations herein are described primarily in the context of broadband services via LTE, other wireless protocols may be used. For example, components conforming to LTE standards described herein may be replaced by components conforming to other network protocols, such as, for example, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.

Although FIG. 2 shows example devices and/or networks of environment 200, in other implementations, environment 200 may contain fewer devices and/or networks, different devices and/or networks, differently arranged devices and/or networks, and/or additional devices and/or networks than those depicted in FIG. 2. Alternatively, or additionally, one or more devices of environment 200 may perform one or more other tasks described as being performed by one or more other devices of environment 200.

FIG. 3A is a diagram of example components of a first type of outdoor unit 230-1 illustrated in FIG. 2. Outdoor unit 230-1 may include some or all of features described above in connection with, for example, outdoor unit 230 (FIG. 2). As illustrated in FIG. 3A, outdoor unit 230-1 may include a RF antenna 310, a LTE module 320, and a subscriber identity module (SIM) 325, all housed in a radome 330. In one implementation, as shown in FIG. 3A, outdoor unit 230-1 may be mounted on an extension arm 340, via a mounting bracket 345, connected to a structure (e.g., an arm, a pole, a residence, etc.).

RF antenna 310 may include an antenna to transmit and/or receive RF signals over the air. RF antenna 310 may, for example, receive RF signals from LTE module 320/SIM card 325 and transmit the RF signals over the air. Also, RF antenna 310 may, for example, receive RF signals over the air and provide them to LTE module 320/SIM 325. In one implementation, for example, LTE module 320/SIM 325 may, via RF antenna 310, communicate with a base station (e.g., base station 240) connected to a network (e.g., network 250) to send and/or receive signals from user devices 210. In implementations herein, RF antenna 310 may be enclosed by radome 330, integrated with radome 330, or external to radome 330. While one RF antenna 310 is shown in FIG. 3A, outdoor unit 230-1 may include more than one antenna in other implementations.

Additionally, or alternatively, RF antenna 310 may include a wideband multiple beam antenna, with partially overlapping dually-polarized antenna beams, spanning three-hundred and sixty (360) degrees in azimuth (x-y plane). For example, antenna 310 may include between four and eight beams to achieve desirable antenna gains and reduction of interference. Additionally, or alternatively, RF antenna 310 may employ two polarizations per beam for a 2×2 downlink multiple-input and multiple-output (MIMO) operation. Alternatively, or additionally, RF antenna 310 may employ slant±45° polarization, vertical/horizontal polarization, or right hand circular (RHC)/left hand circular (LHC) polarization.

Additionally, or alternatively, RF antenna 310 may include a fixed dually-polarized directional antenna. As a directional antenna, RF antenna 310 may use polarizations matched to the polarizations of a particular base station (e.g., base station 240). For example, a polarization of RF antenna 310 may match a polarization of a serving enhanced Node B (eNB) or base station (e.g., base station 240). Antenna pointing for the directional antenna may be conducted, for example, during installation and/or maintenance of outdoor unit 230-1.

LTE module 320 may include a device (e.g., a modem) with communication capability via an air interface. For example, LTE module 320 may receive broadband signals and/or voice over Internet protocol (VoIP) signals from base station 240 (e.g., via RF antenna 310) and may transmit broadband signals and/or VoIP signals to base station 240 (e.g., via RF antenna 310). LTE module 320 may employ frequency division duplex (FDD) and/or time division duplex (TDD) techniques to facilitate downlink and uplink transmissions. LTE module 320 may also, or alternatively, convert electrical signals to RF signals for transmission to base station 240 via RF antenna 310. LTE module 320 may also, or alternatively, convert RF signals, received from base station 240 via RF antenna 310, to electrical signals that may be forwarded on to user device 210 via indoor unit 220-1? LTE module 320 may identify a protocol based on a type of traffic (e.g., a particular LTE protocol for streaming video, voice, data, calls, etc.), and may use the identified protocol to transmit the traffic to base station 240.

In one implementation, LTE module 320 may include a beam selection mechanism that selects the best antenna beam, from RF antenna 310, and/or a serving cell based, generally, on which beam is associated with a strongest RF signal. Beam and/or serving cell selection may be performed, for example, during initial installation, when a change in radio conditions is detected, when a QoS level cannot be maintained, when powering up, and/or during regular maintenance. Additionally, or alternatively, LTE module 320 may select any of the RF antenna 310 beams and/or serving cell, based on real-time measurements, during normal operation. Additionally, or alternatively, LTE module 320 may include a RF switch that enables RF signals to be collected from one or more elements of antenna 310 to create one or more dually polarized antenna beams. In one example, the RF switch may combine RF signals from four antenna elements to create eight dually-polarized beams from which the beam selection mechanism can select a best beam. Based on the selection of the best beam, the RF circuit may cause traffic to be transmitted and/or received via the antenna elements associated with the best beam.

SIM 325 may include a SIM card or an integrated circuit (chip). In general, SIM 325 may function to identify and provide services, such as security services, to the subscriber, associated with customer premises equipment 215, when connecting to a network (e.g., network 250) via base station 240. SIM 325 may contain, for example, a unique serial number (such as an integrated circuit card identifier (ICCID)), an internationally unique number associated with customer premises equipment 215, security authentication and ciphering information, a list of the services to which customer premises equipment 215 has access, etc. In one example, SIM 325 may include a weather proof SIM card that can withstand environmental conditions (e.g., temperature range, moisture, etc.) likely to be encountered by outdoor unit 230-1.

Radome 330 (shown with a cut-away view to reveal LTE module 320 and SIM card 325) may provide a weatherproof enclosure to protect RF antenna 310, LTE module 320, SIM card 325, and/or other components of outdoor unit 230-1. Generally, radome 330 may include any RF transparent or substantially RF transparent structure (e.g., a cover) that protects components in an outdoor environment.

As further shown in FIG. 3A, a communication cable 335 may connect outdoor unit 230-1 to an interface, associated with indoor unit 220-1, that allows outdoor unit 230-1 and indoor unit 220-1 to communicate. Communication cable 335 may, for example, correspond to a coaxial cable, a Telecommunications Industry Association category 5 ("cat 5") cable, and/or some other wired communication mechanism that enables signals to be transported from outdoor unit 230-1 to indoor unit 220-1 and/or from indoor unit 220-1 to outdoor unit 230-1. Additionally, or alternatively, communication cable 335 may permit power to be provided to outdoor unit 230-1, such as via the co-axial cable (e.g., power over co-axial) and/or via the cat 5 cable (e.g., power over twisted pair). Outdoor unit 230-1 may also, or alternatively, include a wireless interface (not shown) that enables signals to be transmitted wirelessly between outdoor unit 230-1 and indoor unit 220-1, which may simplify installation. When outdoor unit 230-1 communicates wirelessly with indoor unit 220-1, a power cable 337, that is different than communication cable 335, may be used to provide power to outdoor unit 230-1.

Although FIG. 3A shows example components of outdoor unit 230-1, in other implementations, outdoor unit 230-1 may contain fewer components, additional components, different components, or differently arranged components than depicted in FIG. 3A. Additionally, or alternatively, one or more components of outdoor unit 230-1 may perform one or more tasks described as being performed by one or more other components of outdoor unit 230-1.

Figure 3B:
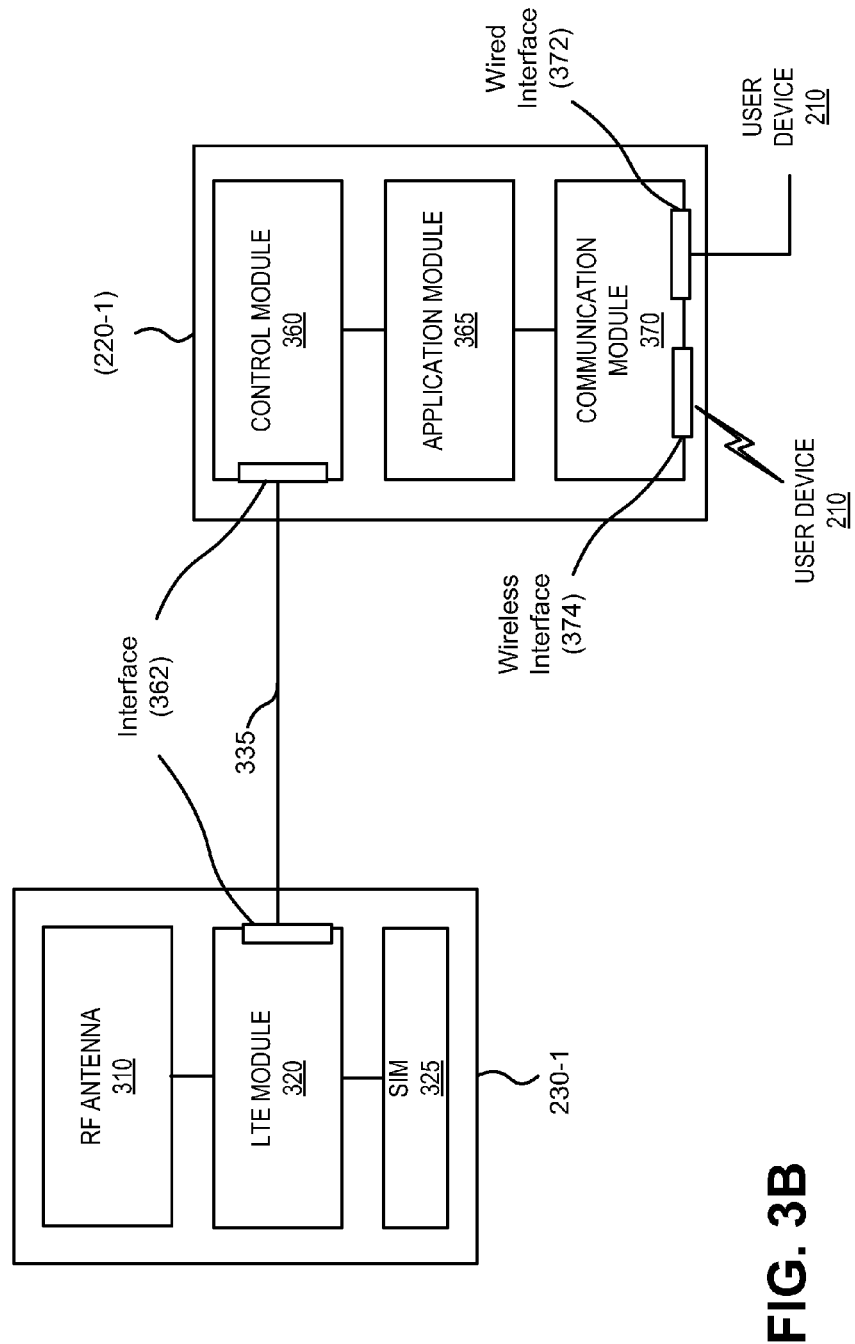
FIG. 3B is a diagram of example components of a type of indoor unit, illustrated in FIG. 2, that is connected to the outdoor unit of FIG. 3A.

FIG. 3B is a diagram of example components of a first type of indoor unit 220-1 that is connected to outdoor unit 230-1. Indoor unit 220-1 may include some or all of the features described above in connection with, for example, indoor unit 220 (FIG. 2). As illustrated, indoor unit 220-1 may include a control module 360, an application module 365, and a communication module 370. In one example, indoor unit 220-1 may be installed within a customer premises.

Control module 360 may communicate with outdoor unit 230-1 to cause outdoor unit 230-1 to perform one or more operations. For example, control module 360 may communicate with outdoor unit 230-1 (e.g., LTE module 320) using a control protocol that includes one or more commands that cause outdoor unit 230-1 to perform one or more operations based on the commands. In one example, control module 360 may provide a power up command to outdoor unit 230-1 which may cause outdoor unit 230-1 to perform a power up operation. Control module 360 may also, or alternatively, provide a power down command to outdoor unit 230-1 that may cause outdoor unit 230-1 to power down. Control module 360 may, possibly, cause power to stop being transmitted, via communication cable 335, to outdoor unit 230-1, which may cause outdoor unit 230-1 to power down. Control module 360 and may also, or alternatively, cause power to be provided to outdoor unit 230-1, via communication cable 335, which may enable outdoor unit 230-1 to power up. Control module 360 may provide other instructions to outdoor unit 230-1 that may cause outdoor unit 230-1 to initialize parameters during installation (e.g., set default channels, identify a default beam, read information from SIM 325, download information from base station 240, etc.), identify a best beam, reset parameters (e.g., when a condition is detected, etc.), provide information associated with signal strength, etc.

LTE module 320 and control module 360 may each include an interface 362 for Ethernet over co-axial signals when signals are transmitted over a co-axial communication cable 335 between control module 360 and LTE module 320. Interface 362 may also provide Ethernet over twisted pair signals when signals are transmitted over a cat 5 communication cable 335 between control module 360 and LTE module 320. Additionally, or alternatively, interface 362 may also enable power to be provided to outdoor unit 230-1 via communication cable 335. Interface 362 may act as a bridge to receive signals from LTE module 320 and convert the received signals to Ethernet over coax and/or cat 5 signals. Control module 360 may also, or alternatively, use interface 362 to maintain information that maps Internet protocol (IP) addresses, associated with user devices 210, to media access control (MAC) addresses associated with user devices 210. This may enable traffic received from base station 240, via outdoor unit 230-1, to be provided to the correct user device 210.

Interface 362 may also, or alternatively, include a physical interface that includes, for example, co-axial ports to connect co-axial communication cables 335, a register jack (RJ)-45 ports to connect cat 5 communication cables 335, universal serial bus (USB) ports to connect USB communication cables 335, an electric power port to connect power cable 337, etc. Interface 362 may also, or alternatively, include one or more test ports that an operator may access to initialize, run diagnostics on, or repair indoor unit 220-1 and/or outdoor unit 230-1. Additionally, or alternatively, interface 362 may include a wireless interface that enables control module 360 to communicate wirelessly with outdoor unit 230-1 (e.g., based on IEEE 802.11 wireless standard, etc.) to provide instructions and/or to handle traffic being transported between LTE module 320 and control module 360.

Control module 360 may also communicate with application module 365 to process traffic received from and/or sent to user device 210. Control module 360 may, for example, instruct application module 365 to process traffic using a particular component and/or application in a manner to be described in greater detail below.

Application module 365, to be described in greater detail below, may perform routing functions and/or process different types of broadband traffic associated with user devices 210. Application module 365 may, for example, process traffic to conform to a QoS level, to decode and/or decompress the traffic, and/or to convert the traffic to a format that is supported by different types of user devices 210. Application module 365 may act as a router and may receive data packets from base station 240 (e.g., via LTE module 320, control module 360, etc.) and may forward the data packets toward user devices 210. Alternatively, or additionally, application module 365 may receive data packets from user devices 210 (e.g., via communication module 370) and may forward the data packets (e.g., via LTE module 320, control module 360, etc.) toward recipient devices via network 250.

Additionally, or alternatively, application module 365 may include set top box functionality that can provide content (e.g., streaming video, VOD content, steaming audio, etc.) to user devices 210 that correspond to video display devices, such as televisions. Application module 365 may, for example, use a compression/decompression (CODEC) application and/or logic to process streaming content so that user devices 210 may process and/or play the streaming content. Application module 365 may include decryption capabilities and may further include a digital video recorder (DVR) (e.g., a hard drive). In one example, application module 365 may conform to MoCA standards.

Communication module 370 may communicate with different types of user devices 210 via wired and/or wireless communications. For example, communications module 370 may include a wired interface 372 that enables different types of user devices 210 to communicate with indoor unit 220-1. Wired interface 372 may include, for example, RJ-45 ports for communicating with a first type of user device 210 (e.g., a computer, etc.); RJ-11 ports for communicating with a second type of user device (e.g., a landline telephone, etc.); multimedia over Coax Alliance (MoCA) ports to provide high definition and/or multimedia content to a third type of user device 110 (e.g., a television, a set top box, a computer, etc.); USB ports for communicating with a fourth type of user device 210 (e.g., a laptop computer, recording equipment, etc.), etc. Communication module 370 may also, or alternatively, include a wireless interface 374 that enables wireless communications (e.g., based on the IEEE 802.11 wireless LAN standards) with a fifth type of user device 210 (e.g., a laptop computer, a tablet computer, a remote control device, a wireless mobile device, etc.). Additionally, or alternatively, wireless interface 374 may also enable communication with a user device 210 (e.g., a remote control device, etc.) that communicates over the air via optical signals (e.g., infrared signals, ultraviolet signals, visual signals, etc.).

Communications module 370 may receive traffic, from application module 365, that is destined for user device 210, and may provide the traffic to the particular user device 210 via a port connected to the particular user device 210. Communications module 370 may also receive traffic from user device 210, via the port, and may provide the traffic to application module 365.

A quantity of modules and interfaces, included within indoor unit 220-1, are provided for explanatory purposes. In other implementations, indoor unit 220-1 may include additional modules and/or interfaces, fewer modules and/or interfaces, different modules and/or interfaces, and/or differently arranged modules and/or interfaces than are shown with respect to FIG. 3B. Alternatively, or additionally, one or more modules of indoor unit 220-1 may perform one or more other tasks described as being performed by one or more other modules of indoor unit 220-1.

Figure 4A:
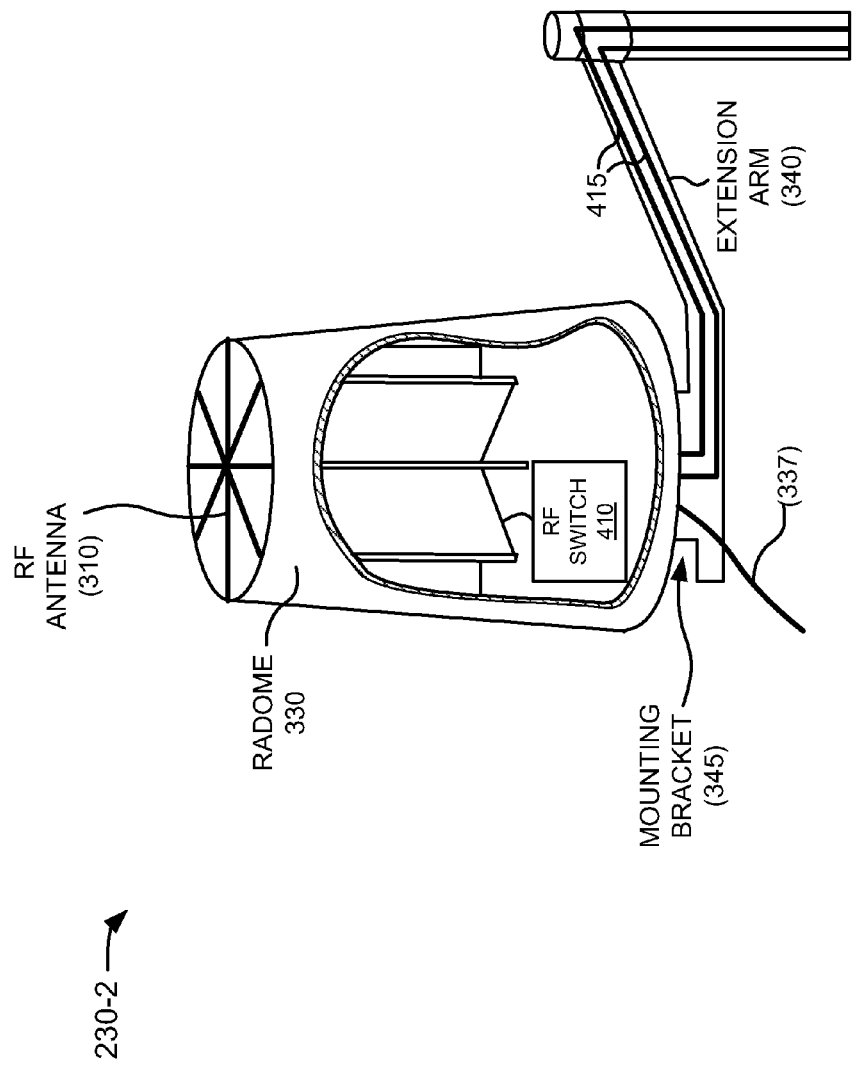
FIG. 4A is a diagram of example components of another type of outdoor unit illustrated in FIG. 2.

FIG. 4A is a diagram of example components of a second type of outdoor unit 230-2 illustrated in FIG. 2. Outdoor unit 230-2 may include some or all of the features described above in connection with, for example, outdoor unit 230 (FIG. 2). As illustrated, outdoor unit 230-2 may include some of the components described above in connection with FIG. 3A, such as RF antenna 310 and radome 330. Outdoor unit 230-2 may also include a RF switch 410 and a dual communication cable 415. In one implementation, as shown in FIG. 4A, outdoor unit 230-2 may be mounted on extension arm 340, via mounting bracket 345, connected to a structure (e.g., an arm, a pole, a customer premises, etc.).

RF antenna 310 may, as described above, include an antenna to transmit and/or receive RF signals over the air. RF antenna 310 may, for example, receive RF signals from LTE module 320/SIM card 325 associated with indoor unit 220-2 (described below in connection with FIG. 4B) and transmit the RF signals over the air. Also, RF antenna 310 may, for example, receive RF signals over the air and provide them to LTE module 320/SIM 325 associated with indoor unit 220-2. In a manner similar to that described above, with respect to FIG. 3A, RF antenna 310 may be enclosed by radome 330, integrated with radome 330, or external to radome 330. While one RF antenna 310 is shown in FIG. 4A, outdoor unit 230-2 may include more than one antenna in other implementations.

RF switch 410 may include one or more components capable of receiving signals from RF antenna 310 and/or communicating with LTE module 320 associated with indoor unit 220-2. For example, RF switch 410 may scan one or more dually-polarized antenna elements associated with antenna 310. RF switch 410 may to collect RF signals from the elements and may provide information associated with the RF signals to LTE module 320, associated with indoor unit 220-2, via dual communication cable 415. Dual communication cable 415 may, for example, correspond to two co-axial cables that are capable of carrying RF signals, prior to demodulation, with minimal loss. Dual communication cable 415 may, thus, carry RF signals associated with two polarizations per each beam pair for a 2×2 downlink MIMO transmission.

RF switch 410 may, for example, collect the RF signals to create one or more dually polarized antenna beams. In one example, the RF switch 410 may combine RF signals from four antenna elements to create eight dually-polarized beams (e.g., four beam pairs) from which a beam selection mechanism, associated with LTE module 320, can select a best beam. In this example, four dual communication cables 425 may be needed to transport the RF signals. Based on the selection of the best beam, RF switch 410 may cause traffic to be transmitted and/or received via antenna elements associated with the best beam. Beam and/or serving cell selection may be performed, for example, during initial installation, when a change in radio conditions is detected, when powering up, and/or during regular maintenance.

Additionally, or alternatively, RF switch 410 may collect RF signals on a per-element basis. For example, RF switch 410 may provide, to LTE module 320 associated with indoor unit 220-2, first RF signals that correspond to a first pair of beams associated with a first element; followed by second RF signals that correspond to a second pair of beams associated with a second element; and so on. The beam selection mechanism, associated with LTE module 320, may select a best beam based on the RF signals associated with the first element, the second element, etc. In this example, one dual communication cable 415 may be implemented, which may reduce time, cost, and/or complexity associated with installation. This example may also, or alternatively, be implemented with respect to outdoor unit 230-1.

Radome 330 (shown with a cut-away view to reveal RF switch 410 and/or RF antenna 310) may provide a weatherproof enclosure to protect RF antenna 310, RF switch 410, and/or other components of outdoor unit 230-2. Generally, radome 330 may include any RF transparent or substantially RF transparent structure (e.g., a cover) that protects components in an outdoor environment.

As further shown in FIG. 4A, a dual communication cable 415 may connect outdoor unit 230-2 to indoor unit 220-2, that allows outdoor unit 230-2 and indoor unit 220-2 to communicate. Dual communication cable 415 may, as described above, correspond to a dual co-axial cable and/or some other wired communication line that enables RF signals, prior to demodulation, to be transported from outdoor unit 230-2 to indoor unit 220-2 and/or from indoor unit 220-2 to outdoor unit 230-2. Additionally, or alternatively, dual communication cable 415 may permit power to be provided to outdoor unit 230-2 via one or more the co-axial cables (e.g., power over co-axial). Power may also, or alternatively, be provided to outdoor unit 230-2 via power cable 337 that is different than dual communication cable 415.

Figure 4B:
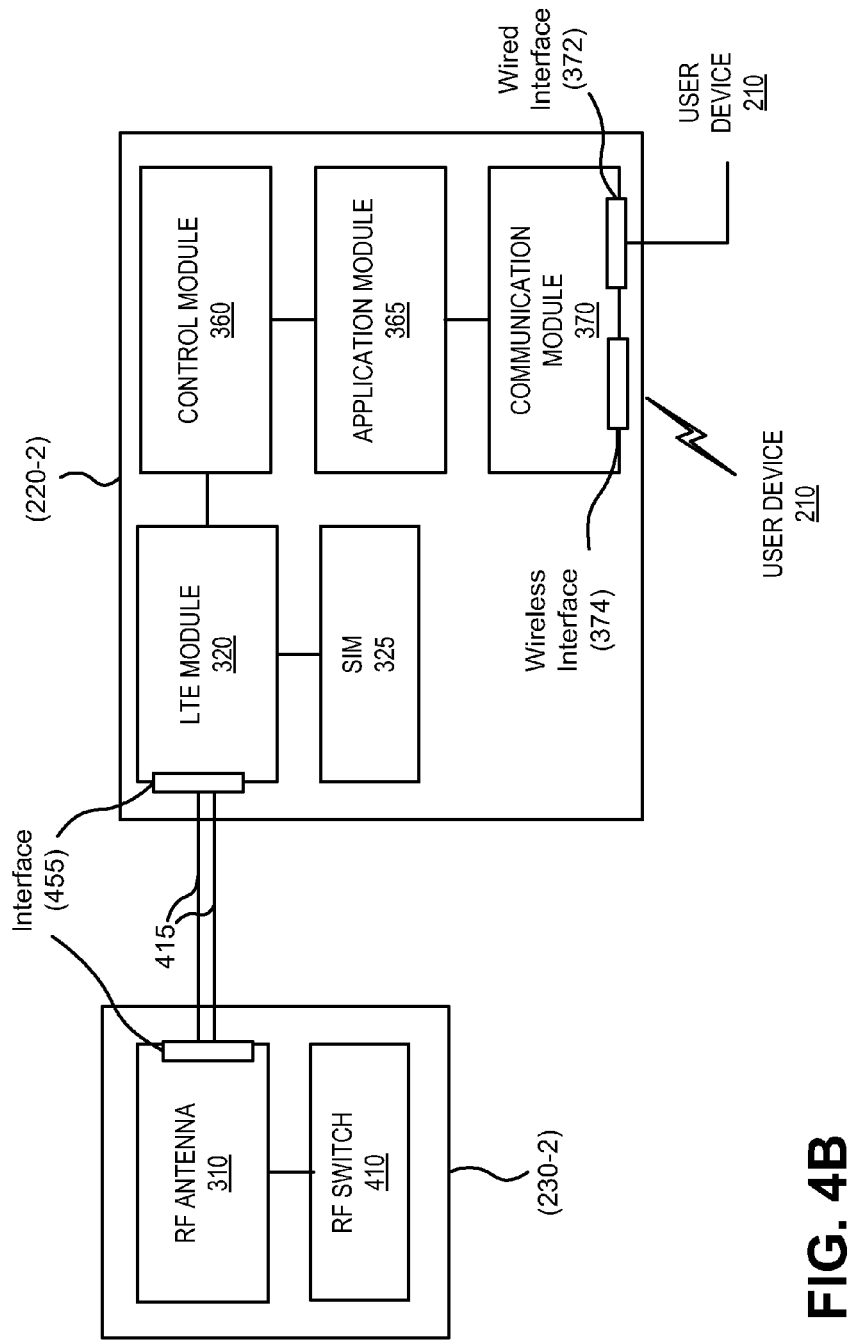
FIG. 4B is a diagram of example components of another type of indoor unit, illustrated in FIG. 2, that is connected to the other outdoor unit of FIG. 4A.

FIG. 4B is a diagram of example components of a second type of indoor unit 220-2 that is connected to outdoor unit 230-2. Indoor unit 220-2 may include some or all of the features described above in connection with, for example, indoor unit 220 (FIG. 2). As illustrated, indoor unit 220-2 may include a collection of components described above in connection with outdoor unit 230-1 (FIG. 3A), such as LTE module 320 and SIM 325; a collection of components described above in connection with indoor unit 220-1 (FIG. 3B); and an interface 455. In one example, indoor unit 220-2 may be installed within a customer premises.

Control module 360 may communicate with LTE module 320 to control communications with base station 240 and/or with outdoor unit 230-2 to cause outdoor unit 230-2 to perform one or more operations. For example, control module 360 may, in a manner similar to that described above with respect to FIG. 3B use a control protocol when instructing outdoor unit 230-2 and/or LTE module 320 to perform operations (e.g., power up, power down, initialize, reset, select a best beam, provide radio conditions, etc.). When communicating with outdoor unit 230-2, control module 360 may communicate via LTE module 320.

LTE module 320 may, in addition to the functions described above with respect to FIG. 3A, communicate with outdoor unit 230-2 over dual communication cable 415 and via interface 455. For example, interface 455 may provide for Ethernet over co-axial signals when signals are transmitted over dual communication cable 415 between LTE module 320 and outdoor unit 230-2. LTE module 320 may also, or alternatively, communicate with RF switch 410, via dual communication cable 415 and/or interface 455 to cause RF switch 410 to scan antenna elements, associated with RF antenna 310, to obtain information that enables LTE module 320 to identify a best beam (e.g., generally associated with a strongest RF signal). LTE module 320 (or control module 360) may also, or alternatively, use interface 455 to maintain information that maps IP addresses, associated with user devices 210, to MAC addresses associated with user devices 210. This may enable traffic received from base station 240, via outdoor unit 230-2, to be provided to the correct user device 210.

Interface 455 may enable power to be provided to outdoor unit 230-2 via dual communication cable 455. Interface 455 may also, or alternatively, include a physical interface that includes, for example, co-axial ports to connect dual co-axial cables, associated with dual communication cables 455. The physical interface may also include other ports that enable other devices to connect to indoor unit 220-2 and/or outdoor unit 230-2, such as RJ-45 ports, USB ports, an electric power port to connect power cable 337, etc. Interface 455 may also, or alternatively, include one or more test ports that an operator may access to initialize, run diagnostics on, or repair indoor unit 220-2 and/or outdoor unit 230-2.

Including LTE module 320 and/or SIM 325 within indoor unit 220-2 may protect sensitive electronics, associated with LTE module 320 and/or SIM 325, from moisture and/or temperature extremes associated with the environment in which outdoor unit 230-2 is installed (e.g., outside the customer premises). The environment in which indoor unit 220-2 is installed (e.g., inside the customer premises) may enable lower cost, less environmentally robust, electronics to be used to implement LTE module 320 and SIM 325. In one example, SIM 325 may be implemented as a non-weather proof SIM card within indoor unit 220-2 which may be lower cost than a weather proof SIM card used by outdoor unit 230-1. Additionally, or alternatively, including LTE module 320 and/or SIM 325 within indoor unit 220-2 may enable interface 455, associated with indoor unit 220-2 and outdoor unit 230-2, to be less complex and/or less costly than interface 362 associated with indoor unit 220-1 and outdoor unit 230-1. Customer premises equipment 215, based on indoor unit 220-2 and outdoor unit 230-2, may cost less than customer premises equipment 215 based on indoor unit 220-1 and outdoor unit 230-1 due to reducing the complexity and/or cost of interface 455 relative to interface 362.

Figure 5:
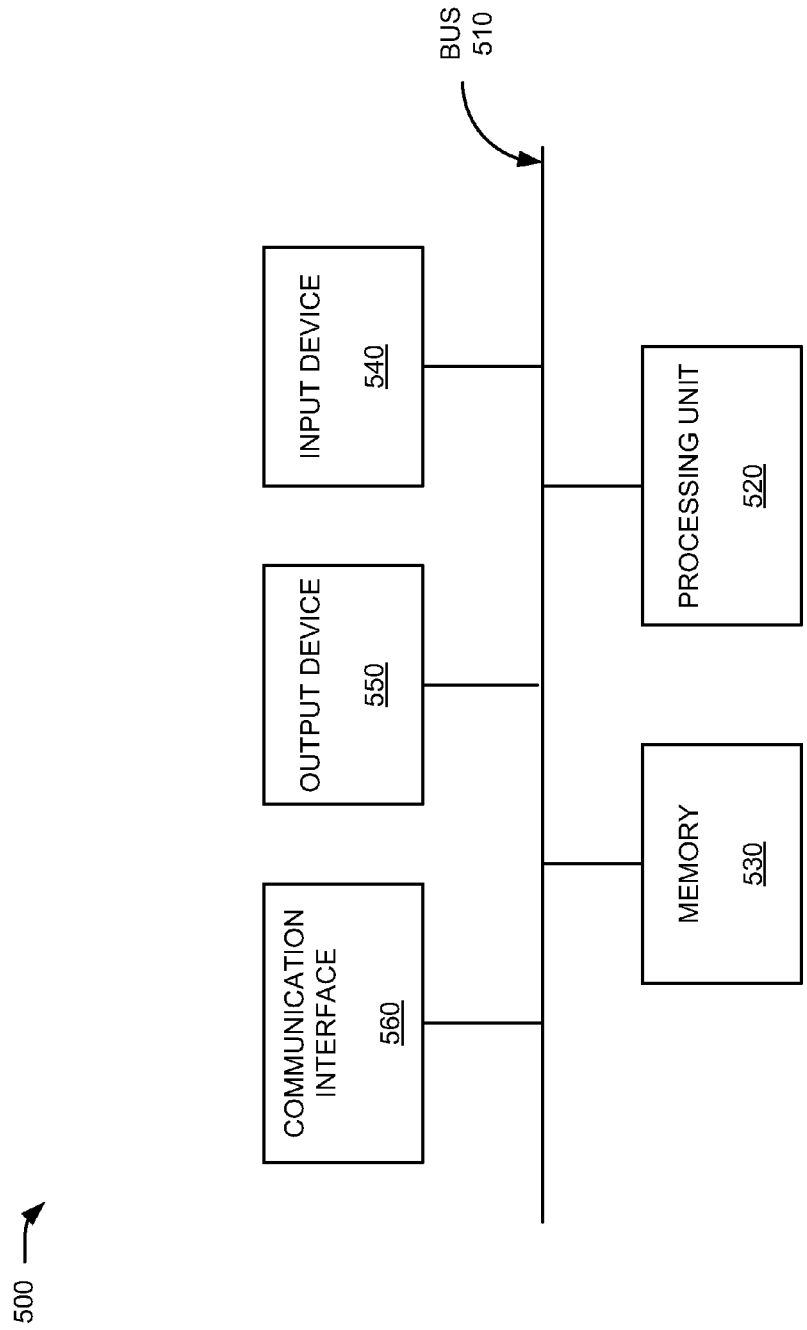
FIG. 5 is a diagram of example components of a device that may correspond to one or more of the devices or components of FIGS. 2 through 4B.

FIG. 5 is a diagram of example components of a device 500 that may correspond to user device 210, indoor unit 220, outdoor unit 230, and/or components of user device 210, indoor unit 220, and/or outdoor unit 230. Alternatively, or additionally, each of user device 210, indoor unit 220, and/or outdoor unit 230 may include one or more of devices 500 and/or one or more components of device 500.

Device 500 may include a bus 510, a processing unit 520, a memory 530, an input device 540, an output device 550, and a communication interface 560. Although FIG. 5 shows example components of device 500, in other implementations, device 500 may contain fewer components, additional components, different components, or differently arranged components than depicted in FIG. 5. For example, device 500 may include one or more switch fabrics instead of, or in addition to, bus 510. Additionally, or alternatively, one or more components of device 500 may perform one or more tasks described as being performed by one or more other components of device 500.

Bus 510 may permit communication among the components of device 500. Processing unit 520 may include one or more processors or microprocessors that interpret and execute instructions. In other implementations, processing unit 520 may be implemented as or include one or more application specific integrated circuits (ASICs), field programmable gate arrays (FPGAs), or the like.

Memory 530 may include a random access memory (RAM) or another type of dynamic storage device that stores information and instructions for execution by processing unit 520, a read only memory (ROM) or another type of static storage device that stores static information and instructions for the processing unit 520, and/or some other type of magnetic or optical recording medium and its corresponding drive for storing information and/or instructions.

Input device 540 may include a device that permits an operator to input information to device 500, such as a keyboard, a keypad, a mouse, a pen, a microphone, one or more biometric mechanisms, and the like. Output device 550 may include a device that outputs information to the operator, such as a display, a speaker, etc.

Communication interface 560 may include any transceiver-like mechanism that enables device 500 to communicate with other devices and/or systems. For example, communication interface 560 may include mechanisms for communicating with other devices, such as other devices of environment 200.

As described herein, device 500 may perform certain operations in response to processing unit 520 executing software instructions contained in a computer-readable medium, such as memory 530. A computer-readable medium may be defined as a non-transitory memory device. A memory device may include space within a single physical memory device or spread across multiple physical memory devices. The software instructions may be read into memory 530 from another computer-readable medium or from another device via communication interface 560. The software instructions contained in memory 530 may cause processing unit 520 to perform processes described herein. Alternatively, hardwired circuitry may be used in place of or in combination with software instructions to implement processes described herein. Thus, implementations described herein are not limited to any specific combination of hardware circuitry and software.

FIG. 6 is a diagram of example functional components of application module 365 of indoor unit 220. As shown in FIG. 6, application module 365 may include a collection of functional components, such as a quality of service (QoS) component 605, a call component 610, an upload/download component 615, and a streaming component 620. Although FIG. 6 shows example functional components of application module 365, in other implementations, application module 365 may include fewer functional components, additional functional components, different functional components, or differently arranged functional components than depicted in FIG. 6. Additionally, or alternatively, one or more functional components, of application module 365, may perform one or more tasks described as being performed by one or more other functional components of application module 365.

QoS component 605 may enable indoor unit 220 to process different types of broadband traffic based on one or more QoS levels. For example, QoS component 605 may map QoS levels to types of traffic being processed by indoor unit 220. For example, QoS component 605 may identify a type of traffic (e.g., data, a call, streaming video, voice, etc.) being processed by indoor unit 220 and may identify a QoS level with which to process the traffic. Additionally, or alternatively, QoS component 605 may determine whether content is being received as unicast content, multicast content, or broadcast content and may map a QoS level to the content based on whether the content is received as unicast content, multicast content, and/or broadcast content. The QoS level may specify a quantity of bandwidth, a data rate (e.g., a bit rate, a frame rate, etc.), an error rate (e.g., a bit error rate, a packet loss error rate, etc.), a forwarding priority (e.g., best efforts, assured forwarding, expedited forwarding, etc.), etc. with which to process the traffic.

QoS component 605 may, for example, associate a first QoS level with a first type of traffic, such as a call (e.g., a voice over IP (VoIP) call, etc.) being handled by indoor unit 220. Associating the first QoS level with the call may cause indoor unit 220 (e.g., call component 610) to handle the call in a manner that conforms to the first QoS level. QoS component 605 may also, or alternatively, associate a second QoS level with a second type of traffic, such as content (e.g., a file, a document, an image, an email message, audio, video, etc.) being downloaded by indoor unit 220. Associating the second QoS level with the downloaded content may cause indoor unit 220 (e.g., upload/download component 615) to download the content in a manner that conforms to the second QoS level.

Additionally, or alternatively, QoS component 605 may associate a third QoS level with a third type of traffic, such as streaming media (e.g., live streaming video and/or audio, VOD content, etc.) being received by indoor unit 220. Associating the third QoS level with the streaming content may cause indoor unit 220 (e.g., streaming component 620) to process the streaming content in a manner that conforms to the third QoS level.

Additionally, or alternatively, QoS component 605 may associate other levels of QoS (e.g., a fourth QoS level, a fifth QoS level, etc.) with other types of traffic received by indoor unit 220. The levels of QoS may also, or alternatively, specify other information to be used to process the traffic based on amounts of jitter associated with the traffic; quantities of lost error correction symbols; quantities of dropped packets, delayed packets, out-of-order packets associated with the traffic, etc.

Call component 610 may enable indoor unit 220 to handle voice and/or video calls being received and/or placed by user device 210. Call component 610 may, for example, use a protocol (e.g., a session initiation protocol (SIP)) to communicate with base station 240 so that a call session may be established. In one example, call component 610 may establish call sessions to handle calls placed by user device 210 (e.g., a landline telephone, a wireless mobile device, etc.). Call component 610 may also, or alternatively, enable calls, received from a remote user device 210 (e.g., via network 250), to be sent to user device 210. Call component 610 may provide other features, associated with the call session, such as terminating the call session (e.g., when user device 210 or the remote user device 210 hangs up), placing calls on hold, transferring calls, etc. Call component 610 may also, or alternatively, handle video calls that include video streaming in addition to voice content. Call component 610 may communicate with QoS component 605 to ensure that voice calls and/or video calls are processed at an appropriate QoS level.

Upload/download component 615 may enable indoor unit 220 to upload content to network 250 and/or download content from network 250. For example, upload/download component 615 may use one or more protocols to upload and/or download content. For example, upload/download component 615 may send and/or receive one or more files (e.g., using a file transfer protocol (FTP) or some other protocol), and may store files, received from network 250, in a memory associated with indoor unit 220. Upload/download component 615 may also, or alternatively, send and/or receive other types of content, such as text, images, video content, audio content, data, etc. (e.g., using a HTTP protocol or some other multimedia protocol); a message (e.g., using simple message transfer protocol (SMTP), an Internet message access protocol (IMAP), a short message service (SMS) protocol, or some other protocol); and/or other types of content. Upload/download component 615 may store the received content in the memory. Upload/download component 615 may also, or alternatively, provide downloaded content to user device 210. Upload/download component 615 may communicate with QoS component 605 to ensure that the uploaded and/or downloaded content is processed at an appropriate QoS level.

Streaming component 620 may receive streaming content and may provide the streaming content to user device 210. For example, streaming component 620 may use one or more protocols (e.g., a real time streaming protocol (RTSP) or some other streaming protocol) to receive streaming content (e.g., streaming video, VOD content, streaming audio, etc.). Streaming component 620 may, on a near real-time basis, adapt to different data rates based on available bandwidth, available processing resources, radio conditions (e.g., associated with outdoor unit 230), etc. Streaming component 620 may also, or alternatively, decode and/or decompress (e.g., using a CODEC) the streaming content to enable the streaming content to be processed. Streaming component 620 may also, or alternatively, convert the data to a format that can be supported by user device 210 (e.g., a computer, a wireless mobile device, television, etc.). The format may, for example, be based on a level of resolution, a screen size, a protocol, a data rate, etc. that is supported by user device 210. Streaming component 620 may communicate with QoS component 605 to ensure that streaming content is processed at an appropriate QoS level.

FIG. 7 is a flow chart of an example process 700 for controlling customer premises equipment 215. In one implementation, process 700 may be performed by control module 360 of indoor unit 220. In another implementation, some or all of process 700 may be performed by another device or group of devices, including or excluding control module 360 and/or indoor unit 220.

As shown in FIG. 7, process 700 may include receiving a request to power up (block 705) and providing a first instruction to power up based on the request (block 710). For example, control module 360 may receive a request to power up. In one example, the request may be received when a user, of user device 210, presses a button, on indoor unit 220, to cause indoor unit 220 to power up. Additionally, or alternatively, the user may use user device 210 to provide the request to power up to indoor unit 220. The request, in this example, may be received by communication module 370 (e.g., via wired interface 372 and/or wireless interface 374) and communication module 370 may provide the request to control module 360. In one example, user device 210 may correspond to a remote control device. Additionally, or alternatively, user device 210 may transmit other requests, such as a request to place a call, to a request to access a service, etc., that may cause control module 360 to treat the these other requests as requests to power up.

Control module 360 may, as a result of receiving the request, provide, to one or more other components of indoor unit 220 (e.g., application module 365, etc.), a first instruction to power up. When indoor unit 220 corresponds to indoor unit 220-2, control module 360 may provide the first instruction to LTE module 320 and/or SIM 325. Additionally, or alternatively, control module 360 may use a control protocol to provide the first instruction to LTE module 320 and/or SIM 325. The first instruction, in this example, may include a command (e.g., a power up command), based on the control protocol, that causes LTE module 325 and/or SIM 325 to perform an operation to power up.

As also shown in FIG. 7, process 700 may include transmitting, to outdoor unit 230, a second instruction to power up (block 715) and receiving an indication that outdoor unit has powered up based on the second instruction (block 720). For example, control module 360 may transmit, to outdoor unit 230, a second instruction to power up. When indoor unit 220 corresponds to indoor unit 220-1, control module 360 may provide the second instruction to LTE module 320 and/or SIM 325 associated with outdoor unit 230-1. Additionally, or alternatively, control module 360 may use the control protocol, described above, to provide the second instruction to LTE module 320 and/or SIM 325 associated with outdoor unit 230-1. The second instruction, in this example, may include the command that causes LTE module 325 and/or SIM 325 to perform an operation to power up. Indoor unit 220-1 may provide the second instruction to outdoor unit 230-1 via interface 362 and/or communication cable 335. Additionally, or alternatively, control module 360 may provide electrical power to outdoor unit 230-1, via interface 362 and/or communication cable 335, which may enable LTE 320 and/or SIM 325 to power up. When a wireless connection is used instead of communication cable 335, control module 360 may cause power to be supplied to outdoor unit 230-1 via power cable 337. LTE 320 may transmit, to control module 360, an indication that outdoor unit 230-1 is powered up. The indication may be transmitted via interface 362 over communication cable 335 and/or a wireless connection.

When indoor unit 220 corresponds to indoor unit 220-2, control module 360 may provide the second instruction to RF switch 410, associated with outdoor unit 230-2, which may cause RF switch 410 to power up. Additionally, or alternatively, LTE module 320, associated with indoor unit 220-2, may provide the second instruction to RF switch in response to the first instruction received from control module 360. Indoor unit 220-2 may provide the second instruction via interface 455 and/or dual communication cable 415. Additionally, or alternatively, control module 360 may provide electrical power to RF switch 410, via interface 455 and over dual communication cable 415, which may enable RF switch 410 to power up. RF switch 410 may power up and may provide an indication, to indoor unit 220-2 (e.g., LTE module 320 and/or control module 360), that RF switch 410 is powered up. The indication may be transmitted via interface 455 and over dual communication cable 415.

As further shown in FIG. 7, process 700 may include providing instruction to select a best beam (block 725) and receiving an indication that the best beam has been selected based on the instruction to select the best beam (block 730). For example, control module 360 may provide an instruction, to LTE module 320, to select a best beam associated with RF antenna 310. The instruction, to select the best beam, may, for example, be based on the control protocol and may include a command (e.g., a select best beam command) to identify a best beam.

Additionally, or alternatively, the instruction to select the best beam may be provided in other situations, such as when control module 360 determines that a QoS level, associated with traffic being processed by indoor unit 220, cannot be maintained. The instruction to select the best beam may also, or alternatively, be provided when indoor unit 220 and/or outdoor unit 230 are being installed and/or repaired. The instruction to select the best beam may also, or alternatively, be provided based on a time interval (e.g., every 12 hours, 24 hours, 7 days, 14 days, etc.); based on a time of day, week, month, etc. (e.g., at midnight, on Sundays, a third week of every month, etc.); and/or upon a occurrence of some event (e.g., when a instruction is received via base station 240, when changed radio conditions are detected, etc.).

When indoor unit 220 corresponds to indoor unit 220-1, the instruction, to select the best beam, may be provided to LTE module 325, via interface 362 and over communication cable 335 and/or a wireless connection. LTE module 325 may receive the instruction and may use a mechanism to employ one or more known techniques to select a best beam. The best beam may generally correspond to a beam with a strongest RF signal. For example, the mechanism may scan particular beams of the RF antenna 310 to determine one or more metrics associated with the particular beams. The metrics may include one or more of a signal to interference plus noise ratio (SINR), a received signal strength indicator (RSSI), a reference symbol received power (RSRP), a downlink (and/or uplink) path loss, a reference symbol received quality (RSRQ), a ratio of a serving cell RSRP to a sum of detected cells RSRP, a channel rank and/or a channel quality indicator (CQI), a throughput, and/or a transmit power. The antenna unit may select a best beam based on the determined metrics.

When indoor unit 220 corresponds to indoor unit 220-2, the instruction may be provided directly to LTE module 320. LTE module 320 may, as a result of receiving the instruction, provide another instruction to RF switch 410, via interface 455 and over dual communication cable 415. The other instruction may cause RF switch 410 to scan beams associated with RF antenna 310 to obtain metrics associated with each of the beams. RF switch 410 may transmit, to LTE module 320, information that identifies the metrics associated with the beams. LTE module 320 may receive the information identifying the metrics, and may select the best beam based on the metrics.

Additionally, or alternatively, LTE module 320, associated with outdoor unit 230-1 and/or indoor unit 220-2, may retrieve, from a memory associated with LTE module 320, information that identifies a best beam that was previously used (e.g., prior to powering down during a previous operation). Additionally, or alternatively, LTE module 320 may automatically perform the operation to select the best beam without receiving the instruction to select the best beam from control module 360.

As yet further shown in FIG. 7, process 700 may include sending and/or receiving traffic via the best beam (block 735). Control module 360 may receive traffic via LTE module 320 and may cause the traffic to be processed by indoor unit 220. Control module 360 may, for example, communicate with application module 365 to process the traffic using one or more components (e.g., components 605-620 of FIG. 6) that enable traffic to be provided to user devices 210 and/or to be transmitted to base station 240 via outdoor unit 230. Processing traffic is described in greater detail below with respect to FIG. 8. In one example, processing the traffic, based on the selection of the best beam, may enable the traffic to be processed at a QoS level associated with the LTE standard.

As still further shown in FIG. 7, process 700 may include receiving a request to power down (block 740) and transmitting, to the outdoor unit, a first instruction to power down based on the request to power down (block 745). For example, a control module 360 may receive, via communication module 370, a request to power down from user device 210 in a manner similar to that described above with respect to block 705. Additionally, or alternatively, control module 360 may receive the request to power down when the user presses one or more buttons on input unit 220.

Control module 360 may, as a result of receiving the request to power down, transmit a first instruction, to power down, to outdoor unit 230. When indoor unit 220 corresponds to indoor unit 220-1, control module 360 may transmit the first instruction to power down to LTE module 320 and/or SIM 325 associated with outdoor unit 230-1. Additionally, or alternatively, control module 360 may use the control protocol, described above, to transmit the first instruction to power down to LTE module 320 and/or SIM 325 associated with outdoor unit 230-1. The first instruction to power down, in this example, may include a command that causes LTE module 325 and/or SIM 325 to perform an operation to power down. Indoor unit 220-1 may transmit the first instruction, to power down, via interface 362 and/or communication cable 335. Additionally, or alternatively, control module 360 may cause electrical power to stop being transmitted to outdoor unit 230-1 via communication cable 335 and/or power cable 337.

When indoor unit 220 corresponds to indoor unit 220-2, control module 360 may transmit the first instruction to power down to RF switch 410, associated with outdoor unit 230-2, which may cause RF switch 410 to power down. Additionally, or alternatively, LTE module 320, associated with indoor unit 220-2, may transmit the first instruction to power down to RF switch 410 in response to the first instruction to power down received from control module 360. Indoor unit 220-2 may transmit the first instruction to power down via interface 455 and/or dual communication cable 415. Additionally, or alternatively, control module 360 may cause electrical power to stop being transmitted to RF switch 410, via dual communication cable 415 and/or power cable 337.

As also shown in FIG. 7, process 700 may include providing a second instruction to power down based on the request to power down (block 750). For example, control module 360 may provide a second instruction, to power down, to one or more components, associated with indoor unit 220, which may cause the components to power down. In one example, communication module 370 may not power down and/or may enter a standby mode that allows communication module 370 to receive signal from user device 210 (e.g., associated with an instruction to power up, to place a call, etc.).

FIG. 8 is a flow chart of an example process 800 for processing different types of broadband traffic based on one or more QoS levels. Process 800 may correspond to block 735 of FIG. 7. In one implementation, process 800 may be performed by indoor unit 220. In another implementation, some or all of process 800 may be performed by another device or group of devices, including or excluding indoor unit 220.

As shown in FIG. 8, process 800 may include receiving a request to establish a session (block 805) and identifying a type of session to be established based on the request (block 810). For example, indoor unit 220 may receive a request to establish a communication session from user device 210. Indoor unit 220 may, in response to receiving the request, determine a type of session to establish based the type of user device 210, from which the request is received, a protocol on which the request is based, and/or a port and/or channel via which the request is received.

For example, indoor unit 220 (e.g., application module 360) may determine that the request, received from user device 210, is based on a first protocol (e.g., SIP, etc.). Additionally, or alternatively, indoor unit 220 may obtain, from the request, information associated with user device 210 (e.g., a MAC address, a mobile directory number (MDN), an IP address, etc.) that enables indoor unit 220 to determine that the request is received from a first type of user device 210 (e.g., a landline telephone, a wireless device, etc.). Indoor unit 220 may also, or alternatively, determine that the request is received via a first port associated wired interface 372 (e.g., via a RJ-11 port) and/or a first channel and/or frequency associated with wireless interface 374 that connects to the first type of user device 210. Indoor unit 220 may determine that the request corresponds to a request to place a call based on the identification of the first protocol, a type that corresponds to the first type of user device 210, and/or the first port and/or channel via which the request is received.

Additionally, or alternatively, indoor unit 220 may determine that the request is based on a second protocol (e.g., HTTP, FTP, etc.). Additionally, or alternatively, indoor unit 220 may determine that the request is received from a second type of user device 210 (e.g., a desktop computer, a laptop computer, a tablet computer, etc.), based on the information associated with user device 210. Indoor unit 220 may also, or alternatively, determine that the request is received via a second port associated wired interface 372 (e.g., via a RJ-45 port) and/or a second channel and/or frequency associated with wireless interface 374 that connects to the second type of user device 210. Indoor unit 220 may determine that the request corresponds to a request to download content based on the identification of the second protocol, a type that corresponds to second user device 210, and/or the second port and/or channel via which the request is received. Additionally, or alternatively, indoor unit 220 may determine that the request corresponds to a request to download content based on information obtained from the request, such as a destination address of a server device from which content is to be obtained, information that identifies the content to be downloaded (e.g., a file name, a title associated with the content, etc.), etc.

Additionally, or alternatively, indoor unit 220 may determine that the request is based on a third protocol (e.g., RTSP, etc.). Additionally, or alternatively, indoor unit 220 may determine that the request is received from a third type of user device 210 (e.g., a desktop computer, a television, etc.), based on the information associated with user device 210. Indoor unit 220 may also, or alternatively, determine that the request is received via a third port associated wired interface 372 (e.g., via a RJ-45 port, a MoCA port, a co-axial port) and/or a third channel and/or frequency associated with wireless interface 374 that connects to the third type of user device 210. Indoor unit 220 may determine that the request corresponds to a request to stream content (e.g., streaming video, streaming audio, VOD content, etc.), based on the identification of the third protocol, a type that corresponds to the third type of user device 210, and/or the third port and/or channel via which the request is received. Additionally, or alternatively, indoor unit 220 may determine that the request corresponds to a request to receive streaming content based on information obtained from the request, such as a destination address of a server device from which content is to be streamed, information that identifies the streaming content (e.g., an identifier, a title, etc.), etc.

As also shown in FIG. 8, when the request corresponds to a placing a call, process 800 may include identifying a first QoS level for handling the call (block 815). For example, indoor unit 220 (e.g., QOS component 605 of application module 365), may identify a first QoS level to be used to process a voice call. In one example, the first QoS level may correspond to an LTE QoS framework that specifies a first forwarding priority (e.g., priority 2 or other priorities), a guaranteed bit rate, a first amount of packet delay (e.g., 1, 10, 100, etc. milliseconds (ms)) that is permitted, a first packet error loss rate (e.g., 0.01, 0.02, etc.) that is permitted, etc. Additionally, or alternatively, for a video call that includes audio and live video streaming (e.g., video telephony), indoor unit 220 may identify another first QoS level that specifies a second forwarding priority (e.g., priority 4 or other priorities), the guaranteed bit rate, a second amount of packet delay (e.g., 10, 100, 150, etc. ms), a second packet error loss rate (e.g., 0.001, 0.002, etc.), etc.

As further shown in FIG. 8, process 800 may include connecting the call (block 820). For example, indoor unit 220 (e.g., call component 610 of application module 365) may identify resources that are to be used to connect the call to destination user device 210 (e.g., identified by the request). Indoor unit 220 may, for example, identify a channel, a channel bandwidth, and/or a data rate at which the call is to be place. The identified resources may, for example, conform to a LTE protocol, or some other protocol, associated with handling calls. In one example, indoor unit 220-1 may instruct outdoor unit 230-1 (e.g., LTE module 230) to communicate with base station 240 to establish the call based on the identified resources. In another example, indoor unit 220-2 (e.g., LTE module 320) may communicate, via outdoor unit 230-2, with base station 240 to establish the call based on the identified resources. Indoor unit 220 may receive an indication that the call has been establish and may connect the first type of user device 210 to the call.

As yet further shown in FIG. 8, process 800 may include handling the call based on the first QoS level (block 825) and providing the traffic to the user device (block 830). For example, indoor unit 220 may process traffic, associated with the call, based on the first QoS level. For example, indoor unit 220 process the traffic based on the first forwarding priority, the guaranteed bit rate, the first packet error loss rate, the first amount of packet delay, etc. When the call corresponds to the video call, indoor unit 220 may, for example, process the traffic based on the second forwarding priority, the guaranteed bit rate, the second packet error loss rate, the second amount of packet delay, etc. Indoor unit 220 may provide the traffic to the first type of user device 210 in a manner that conforms to the first QoS level or the other first QoS level.

As also shown in FIG. 8, when the request corresponds to downloading content, process 800 may include identifying a second QoS level for downloading content (block 840). For example, indoor unit 220 (e.g., QOS component 605 of application module 365), may identify a second QoS level to be used to download content (e.g., email, a file, audio, video, chat information, etc.) from a server device identified in the request to download content. In one example, the second QoS level may correspond to an LTE QoS framework that specifies a third forwarding priority (e.g., priority 6 or other priorities), a non-guaranteed bit rate, a third amount of packet delay (e.g., 300, 400, etc. milliseconds (ms)) that is permitted, a third packet error loss rate (e.g., 0.00001, 0.00002, etc.) that is permitted, etc.

As further shown in FIG. 8, process 800 may include transmitting a request to download the content (block 845) and receiving the content based on the transmitted request (block 850). For example, indoor unit 220 (e.g., upload/download component 615 of application module 365) may identify resources that are to be used to download the content. Indoor unit 220 may, for example, identify a channel, a channel bandwidth, and/or a data rate with which the content is to be downloaded. The identified resources may, for example, conform to a LTE protocol, or some other protocol, associated with downloading content. In one example, indoor unit 220-1 may instruct outdoor unit 230-1 (e.g., LTE module 230) to communicate with base station 240 to establish a communication session via which the content can be downloaded based on the identified resources. Additionally, or alternatively, indoor unit 220-2 (e.g., LTE module 230) may communicate, via outdoor unit 230-2, with base station 240 to establish the communication session based on the identified resources.

Indoor unit 220 may receive, from base station 240 and via outdoor unit 230, an indication that the communication session has been established and may transmit a request, for the content, to base station 240 via outdoor unit 230. The request may include information (e.g., a title, a file name, an identifier, etc.) that identifies the content and/or information (e.g., an IP address, a uniform resource locator (URL), etc.) that identifies the server device from which the content is to be downloaded. Base station 240 may receive the request and may forward the request to the server device via network 250. Indoor unit 220 may, as a result of transmitting the request to download the content, receive traffic, associated with the content, from base station 240 and via outdoor unit 230.

As yet further shown in FIG. 8, process 800 may include processing the content based on the second QoS level (block 855) and providing the content to the user device (block 830). For example, indoor unit 220 may process traffic, associated with the downloaded, based on the second QoS level. For example, indoor unit 220 process the traffic based on the third forwarding priority, the non-guaranteed bit rate, the third packet error loss rate, the third amount of packet delay, etc. Indoor unit 220 may provide the processed traffic to the second type of user device 210 in a manner that conforms to the second QoS level.

As also shown in FIG. 8, when the request corresponds to streaming content, process 800 may include identifying a third QoS level for the streaming content (block 860). For example, indoor unit 220 (e.g., QOS component 605 of application module 365) may identify a third QoS level to be used to stream content, such as, for example, VOD content, live broadcast/multicast video content, etc. that is received from a server device identified in the request for the streaming content. In one example, the third QoS level may correspond to a LTE QoS framework that specifies a fourth forwarding priority (e.g., priority 7 or other priorities), a non-guaranteed bit rate, a fourth amount of packet delay (e.g., 100, 110, 120, etc. ms) that is permitted, a fourth packet error loss rate (e.g., 0.00001, 0.00002, etc.) that is permitted, etc. Additionally, or alternatively, indoor unit 220 may specify another third QoS level for broadcast/multicast streaming content that is different than the third QoS level for unicast streaming content.

As further shown in FIG. 8, process 800 may include transmitting a request to download the streaming content (block 845) and receiving the streaming content based on the transmitted request (block 850). For example, indoor unit 220 (e.g., streaming component 620 of application module 365) may identify resources that are to be used to stream the content. Indoor unit 220 may, for example, identify a channel, a channel bandwidth, and/or a data rate with which the streaming content is to be downloaded. The identified resources may, for example, conform to a LTE protocol, or some other protocol, associated with downloading content. Additionally, or alternatively, indoor unit 220 may specify a format, that is supported by the third type of user device 210, to be used to stream the content (e.g., a resolution level, screen dimensions, a frame rate, a compression ratio, etc.). In one example, indoor unit 220-1 may instruct outdoor unit 230-1 (e.g., LTE module 230) to communicate with base station 240 to establish a communication session via which the content can be streamed based on the identified resources and/or information associated with the format. Additionally, or alternatively, indoor unit 220-2 (e.g., LTE module 230) may communicate, via outdoor unit 230-2, with base station 240 to establish the communication session based on the identified resources.

Indoor unit 220 may receive, from base station 240 and via outdoor unit 230, an indication that the communication session has been established and may transmit a request, for the content, to base station 240 via outdoor unit 230. The request may include information (e.g., a title, a file name, an identifier, etc.) that identifies the content and/or information (e.g., an IP address, a uniform resource locator (URL), etc.) that identifies the server device from which the content is to be streamed. Base station 240 may receive the request and may forward the request to the server device via network 250. Indoor unit 220 may, as a result of transmitting the request to stream the content, receive the streaming content from base station 240 and via outdoor unit 230.

As yet further shown in FIG. 8, process 800 may include processing traffic based on the third QoS level (block 875) and providing the content to the user device (block 830). For example, indoor unit 220 may receive the streaming content and may decode and/or decompress the streaming content. Additionally, or alternatively, indoor unit 220 may process the streaming content based on the fourth QoS level. For example, indoor unit 220 may process the traffic based on the fourth forwarding priority, the non-guaranteed bit rate, the fourth packet error loss rate, the fourth amount of packet delay, etc. Indoor unit 220 may provide the streaming content to the third type of user device 210 in a manner that conforms to the fourth QoS level. The third type of user device 210 may receive the streaming content and may play the streaming content.

Systems and/or methods, described herein, may provide customer premises equipment that enables fixed wireless broadband services, such as services that previously have been obtained from a satellite network, to be provisioned to a user device without communicating with the satellite network. The customer premises equipment may include an outdoor unit, installed outside the customer premises, that receives the broadband services wirelessly from a LTE network that is based on the 3GPP wireless standard. The customer premises equipment may include an indoor unit, installed within the customer premises, that receives the broadband services from the outdoor unit and that provides the broadband services to a user device associated with the customer premises. The customer premises equipment may also, or alternatively, provide the broadband services at a QoS level associated with a LTE standard and/or for which the user subscribed. In so doing, the broadband services, received from the LTE network, may be provisioned to the user device at a lower cost and with less complexity than when the broadband services, received from the LTE network and the satellite network, are provisioned to the user device.

The foregoing description of implementations provides illustration and description, but is not intended to be exhaustive or to limit the implementations to the precise form disclosed. Modifications and variations are possible in light of the above implementations or may be acquired from practice of the embodiments.

For example, while series of blocks have been described with regard to FIGS. 7 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

The term "component," as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An indoor broadband device comprising:
one or more processors to:
determine a type of traffic of content being requested by a user device,
determine a long term evolution (LTE) protocol based on the type of traffic,
where the LTE protocol identifies:
one or more frequency bands via which the type of traffic is transmitted,
a respective quantity of bandwidth associated with each of the one or more frequency bands,
one or more types of modulation, and
a quality of service (QoS) level supported by the LTE protocol,
instruct an LTE module, of an outdoor broadband device, to use the LTE protocol to communicate with a wireless access network,
determine that the QoS level cannot be maintained for the content being received and processed by the indoor broadband unit,
select, after determining that the QoS level cannot be maintained, a best beam of a plurality of beams provided by an antenna on the outdoor broadband device,
the plurality of beams being associated with a plurality of signals, and
the best beam being associated with a strongest signal of the plurality of signals,
receive and process a portion of the content based on the best beam, and
provide the portion of the content to the user device.

2. The indoor broadband device of claim 1,
where, the type of traffic corresponds to at least one of:
streaming content,
downloadable content, or
voice content associated with a call, and
where the QoS level corresponds to at least one of:
a first QoS level when the type of content corresponds to the streaming content, a second QoS level when the type of content corresponds to the downloadable content, or a third QoS level when the type of content corresponds to the voice content.

3. The indoor broadband device of claim 1, where the one or more processors are further to:

identify a type of the user device to which the content is to be provided, convert another portion of the content to the format that is supported by the user device based on the identified type of the user device, the format that is supported by the user device corresponding to at least one of:

a first type of format when the user device corresponds to a computer device, a second type of format when the user device corresponds to a telephone, or a third type of format when the user device corresponds to a video display device.

4. The indoor broadband device of claim 1, where the one or more processors are further to:

communicate, via the outdoor broadband device and the wireless access network, to establish a session based on the protocol and the QoS level, and receive, via the outdoor broadband device, another portion of the content based on the session.

5. The indoor broadband device of claim 1, where, when selecting the best beam, the one or more processors are to:

transmit, based on determining that the QoS level cannot be maintained and to the outdoor broadband device, an instruction to perform an operation to select the best beam, and receive, from the outdoor broadband device and based on the instruction, an indication that the best beam is selected.

6. The indoor broadband device of claim 1, where, when selecting the best beam, the one or more processors are to:

transmit, based on determining that the QoS level cannot be maintained and to a radio frequency (RF) switch associated with the outdoor broadband device, an instruction to scan the plurality of beams to measure the plurality of signals, receive, from the RF switch, information associated with the plurality of signals, and select the best beam based on the information associated with the plurality of signals.

7. The indoor broadband device of claim 1, where the one or more processors include at least one of:

a first module to control an operation to be performed by the outdoor broadband device, the operation including at least one of:

a first operation to power up, a second operation to power down, or a third operation to select a best beam, a second module to at least one of:

identify the QoS level, process the content in a manner that conforms to the QoS level, or process the content in a manner that conforms to a format that is supported by the user device, or a third module to enable the indoor broadband device to communicate with the user device using a wired communication mechanism or a wireless communication mechanism.

8. The indoor broadband device of claim 7, where the content is one of unicast content or broadcast content.

9. A method comprising:

receiving, by an indoor broadband unit and from a user device, a request to establish a communication session;

determining, by the indoor broadband unit, a type of traffic associated with the communication session;

determining, by the indoor broadband unit, an LTE protocol based on the type of traffic, where the LTE protocol identifies:

one or more frequency bands, a respective quantity of bandwidth associated with each of the one or more frequency bands, one or more types of modulation, and a Quality of Service (QoS) level supported by the LTE protocol;

instructing, by the indoor broadband unit, a long term evolution (LTE) module, of an outdoor broadband unit, to use the LTE protocol to communicate with a wireless access network the wireless access network communicating with a network that provides broadband services;

receiving, by the indoor broadband unit and from the outdoor broadband unit, a first portion of the traffic associated with the communication session;

processing, by the indoor broadband unit, the first portion of the traffic based on the QoS level;

determining, by the indoor broadband unit, that the QoS level cannot be maintained;

identifying, after determining that the QoS level cannot be maintained, a best beam of a plurality of beams provided by an antenna of the outdoor broadband unit, the plurality of beams being associated with a plurality of signals, and the best beam being associated with a strongest signal of the plurality of signals;

receiving and processing, by the indoor broadband unit and by using the best beam, a second portion of the traffic; and providing, by the indoor broadband unit, the traffic to the user device in a manner that conforms to the QoS level.

10. The method of claim 9, further comprising:

determining that the type of communication session corresponds to at least one of:

a first type of communication session to place a call to another user device at a first QoS level, a second type of communication session to download content from the network at a second QoS level, or a third type of communication session to receive streaming content from the network at a third QoS level; and processing the traffic at the first QoS level, the second QoS level, or the third QoS level based on whether the communication session corresponds to the first type of communication session, the second type of communication session, or the third type of communication session, the QoS level being one of the first QoS level, the second QoS level, or the third QoS level.

11. The method of claim 9, where the indoor broadband unit is connected to the outdoor broadband unit via an interface and a communication cable to:

enable the instruction to establish the communication session to be transmitted to the outdoor broadband unit, enable the indoor unit to cause the outdoor broadband unit to perform an operation, the operation including at least one of:

a first operation to power up, a second operation to power down, a fourth operation to initialize parameters, the parameters being used by the outdoor broadband unit to communicate with the wireless access network or the indoor broadband unit, or a fifth operation to reset the parameters after the outdoor unit or the outdoor unit is repaired, and enable power to be provided to the outdoor broadband unit.

12. The method of claim 9, further comprising:
identifying a type of the user device;
processing the traffic in a manner that conforms to a format that is supported by the user device based on the identified type of user device; and
providing the processed traffic to the user device.

13. The method of claim 9, further comprising:
receiving a request to power up;
performing an operation to power up the indoor broadband unit based on the request to power up;
providing power, to the outdoor broadband unit, based on performing the operation to power up the indoor broadband unit;
receiving, from the outdoor broadband unit and before identifying the best beam, an indication that the outdoor broadband unit has powered up.

14. The method of claim 9, where identifying the best beam comprises:
transmitting, to the LTE module of the outdoor broadband unit, an instruction to perform an operation to select the best beam to enable the indoor broadband unit to maintain the QoS level.

15. A system comprising:
a first broadband unit that includes:
a radio frequency (RF) antenna to send and receive RF signals,
the RF antenna providing a plurality of beams that are associated with the RF signals, and
the RF signals carrying traffic from one or more base stations associated with a network that provides broadband services, and
a long term evolution (LTE) module to communicate with the one or more base stations via the RF antenna; and
a second broadband unit that includes:
one or more processors to:
determine a type of the traffic,
determine an LTE protocol based on the type of the traffic,
where the LTE protocol identifies:
one or more frequency bands via which the type of traffic is transmitted,
a respective quantity of bandwidth associated with each of the one or more frequency bands,
one or more types of modulation, and
a Quality of Service (QoS) level supported by the LTE protocol,
instruct the LTE module to use the LTE protocol to communicate with the one or more base stations,
determine that a quality of service the QoS level cannot be maintained for the traffic,
determine, after determining that the QoS level cannot be maintained, a best beam of the plurality of beams,
the best beam being associated with a strongest signal of the RF signals,
receive and process one or more portions of the traffic based on the QoS level and the best beam, and
provide the one or more portions of the traffic to one or more user devices.

16. The system of claim 15, where the first broadband unit is further to:
process the traffic to enable the traffic to be provided to the second broadband unit.

17. The system of claim 16, further comprising:
an interface connecting the first broadband unit and the second broadband unit via a wired communication mechanism or a wireless communication mechanism,
the interface enabling at least one of:
processed RF signals to be transported between the first broadband unit and the second broadband unit,
the processed RF signals corresponding to a first frequency that is less than a second frequency associated with the RF signals, and
the first frequency conforming to a frequency that can be processed by the second broadband unit or can be transported using the wireless communication mechanism,
power to be provided to the first broadband unit when the interface includes the wired communication mechanism, or
an instruction to be provided to the first broadband unit, from the second broadband unit, that causes the first broadband unit to perform an operation,
the operation including at least one of:
a first operation to select the best beam,
a second operation to power up,
a third operation to power down,
a fourth operation to reset parameters after the first broadband unit is repaired,
the parameters being used, by the first broadband unit, to communicate with the one or more base stations or the second broadband unit, or
a fifth operation to initialize the parameters when the first broadband unit is installed.

18. The system of claim 15, further comprising:
an interface connecting the first broadband unit and the second broadband unit via a wired communication mechanism,
the interface enabling at least one of:
the RF signals to be transported between the first broadband unit and the second broadband unit,
power to be provided to the first broadband unit,
an instruction to be provided to the first broadband unit, from the second broadband unit, that causes the first broadband unit to perform an operation to at least one of:
power up, or
power down,
reset parameters after the first broadband unit is repaired, the parameters being used, by the first broadband unit, to communicate with the one or more base stations or the second broadband unit, or
initialize the parameters when the first broadband unit is installed.

19. The system of claim 15, where, when providing the traffic to the one or more user devices, the second broadband unit is to:
identify a type of a user device of the one or more user devices;
process the one or more portions of the traffic in a manner that conforms to a format that is supported by the user device based on the type of user device; and
provide the one or more portions of the traffic to the user device after processing the one or more portions.

20. The system of claim 15, where the second broadband unit is further to:
  receive a request to power up;
  perform an operation to power up the second broadband unit based on the request to power up;
  provide power, to the first broadband unit, based on performing the operation to power up the second broadband unit; and
  receive, from the first broadband unit and before determining the best beam, an indication that the first broadband unit has powered up.

\* \* \* \* \*